(12) United States Patent
Cecala et al.

(10) Patent No.: US 11,465,596 B1
(45) Date of Patent: Oct. 11, 2022

(54) WHEEL CLEANING APPARATUS AND METHOD

(71) Applicant: Carl Freudenberg KG, Weinheim (DE)

(72) Inventors: Fred Cecala, Mount Prospect, IL (US); Leo Gubenko, Winfield, IL (US); Torsten Plate, Glinde (DE); Florian Hattich, Hamburg (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 17/373,242

(22) Filed: Jul. 12, 2021

(51) Int. Cl.
| | | |
|---|---|---|
| *B60S 1/68* | (2006.01) | |
| *B08B 1/02* | (2006.01) | |
| *B08B 1/00* | (2006.01) | |
| *B60S 3/04* | (2006.01) | |

(52) U.S. Cl.
CPC ............... *B60S 1/68* (2013.01); *B08B 1/006* (2013.01); *B08B 1/02* (2013.01); *B60S 3/042* (2013.01)

(58) Field of Classification Search
CPC . B60S 1/68; B60S 3/042; B08B 1/006; B08B 1/02
See application file for complete search history.

(56) References Cited

U.S. PATENT DOCUMENTS

| | | | |
|---|---|---|---|
| 4,841,591 A | 1/1989 | Candow | |
| 5,261,433 A | 11/1993 | Smith | |
| 5,464,391 A | 10/1995 | Cheung et al. | |
| 2002/0004961 A1* | 1/2002 | Nishina | B60S 3/042 15/53.4 |
| 2011/0099736 A1* | 5/2011 | Arledge | A63B 55/60 15/210.1 |
| 2013/0081651 A1* | 4/2013 | Fulton | A63H 19/00 134/123 |
| 2017/0113659 A1* | 4/2017 | Ring | B60S 1/68 |
| 2019/0291700 A1* | 9/2019 | Kosilla, III | A46B 11/063 |

* cited by examiner

*Primary Examiner* — Sharidan Carrillo
(74) *Attorney, Agent, or Firm* — Leydig, Voit & Mayer, Ltd.

(57) ABSTRACT

A system and method for cleaning a cart wheel includes an elongated body having a central channel having an entry end and an exit end. A shuttle slidably engages the elongated body and is engageable by a wheel entering the central channel from the entry end such that the wheel pushes the shuttle along the central channel and disengages the shuttle adjacent the exit end, wherein a sliding engagement between the wheel and the shuttle cleans the wheel.

9 Claims, 30 Drawing Sheets

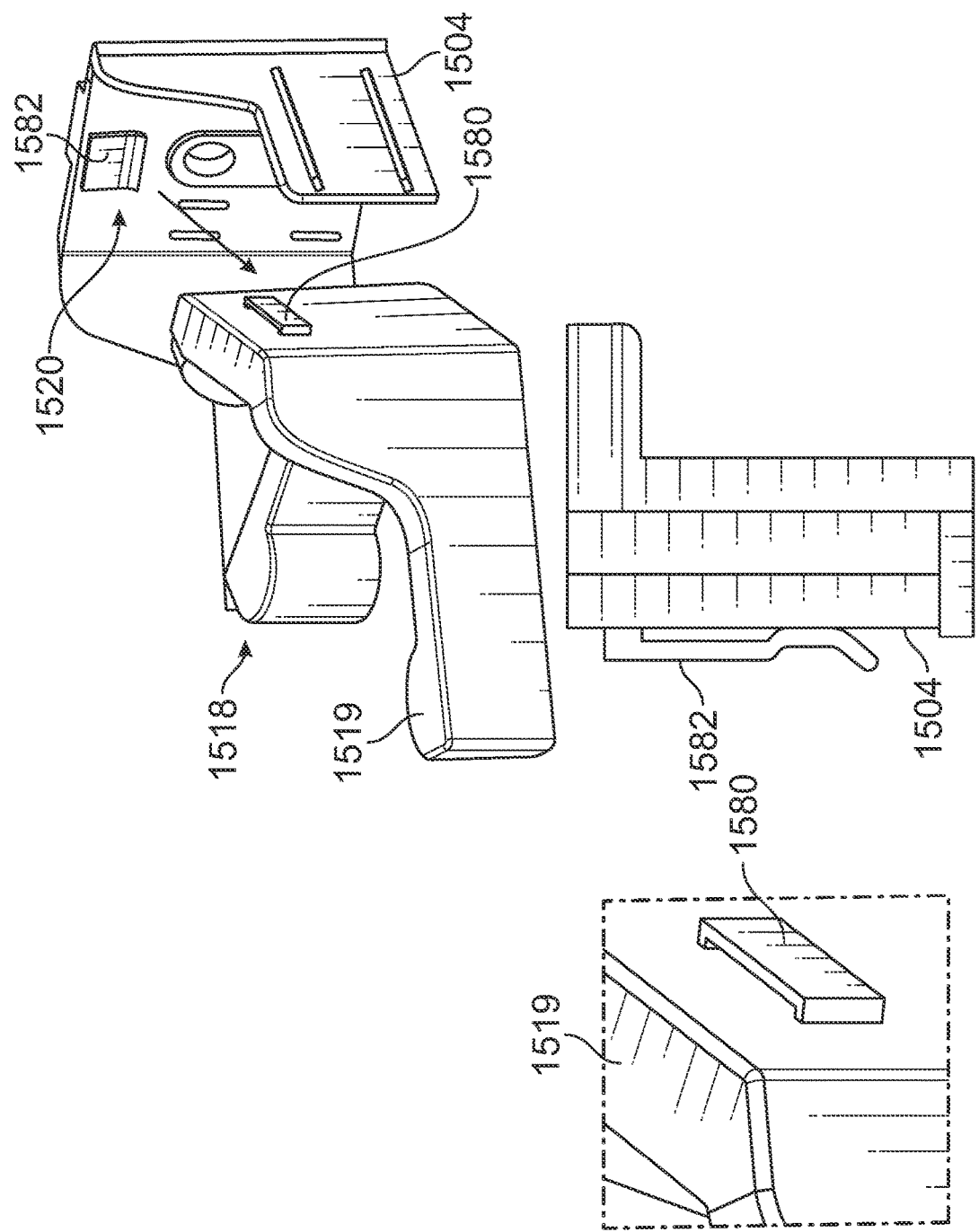

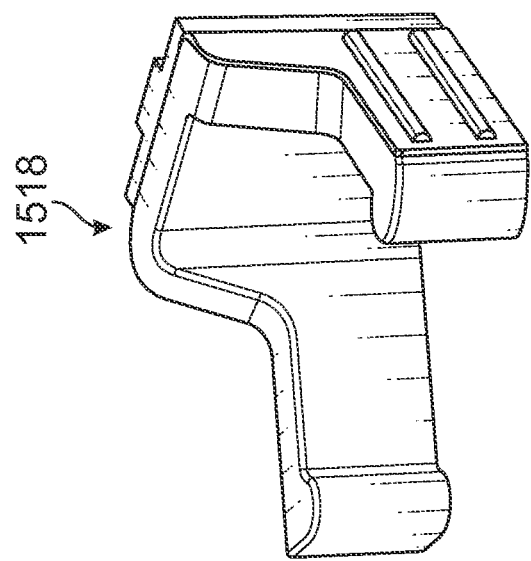
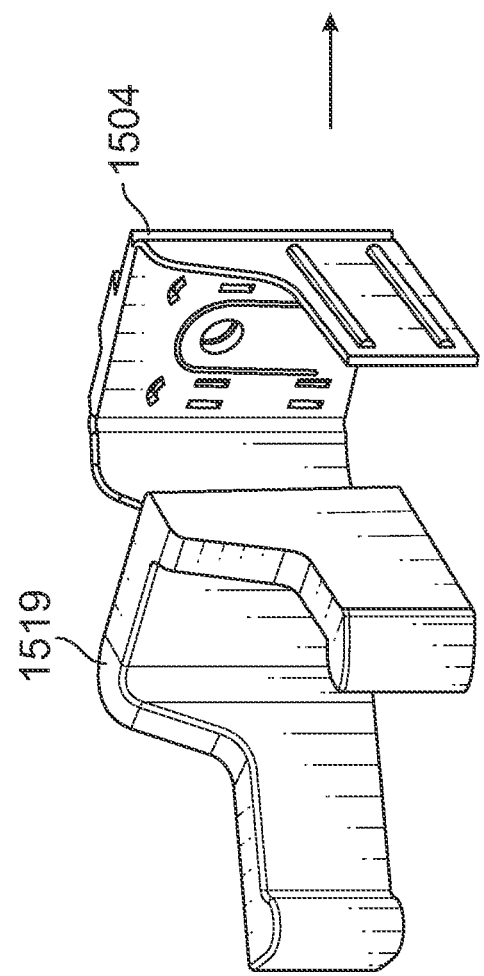
FIG. 38

WHEEL CLEANING APPARATUS AND METHOD

BACKGROUND OF THE INVENTION

Different operating environments such as clean rooms often have dirt or other contaminants being introduced to them by operators and the tools and equipment operators bring into those environments. More particularly, contaminants may be brought into an environment by the carts and wheeled carriers an operator uses to carry material into the clean room. Conversely, an operator risks bringing substances such as germs or hazardous materials out of an operating environment when carrying materials on carts out of the clean room. In addition, there is a risk of cross-contamination coming from the wheels during movement of equipment in and out of critical environments. There is a need for a wheel cleaning device that helps mitigate this risk. Devices and methods according to the disclosure satisfy this need.

BRIEF SUMMARY OF THE INVENTION

In one aspect, the disclosure describes a wheel cleaner. The wheel cleaner includes an elongated body having a central channel, the central channel extending along an entire length of the body in a longitudinal direction. The elongated body also includes a base plate, a left wall plate, and a right wall plate, the left and right wall plates connected to the base plate and extending in spaced relation parallel to one another to define the central channel therebetween. The central channel includes an entry end and an exit end on opposite ends of the elongated body along the longitudinal direction. A shuttle having a mounting plate slidably engaged with the elongated body and is disposed in the slot. The shuttle is engageable by a wheel entering the central channel from the entry end such that the wheel pushes the shuttle along the central channel and disengages the shuttle adjacent the exit end, wherein a sliding engagement between the wheel and the shuttle cleans the wheel as the wheel rolls through the channel.

In another aspect, the disclosure describes a method for cleaning a wheel. The method includes providing an elongated body having a central channel, the central channel extending along an entire length of the body in a longitudinal direction, wherein the elongated body includes a base plate, a left wall plate, and a right wall plate, the left and right wall plates connected to the base plate and extending in spaced relation parallel to one another to define the central channel therebetween, and wherein the central channel includes an entry end and an exit end on opposite ends of the elongated body along the longitudinal direction. The method further includes providing a shuttle slidably disposed within the central channel, the shuttle having a mounting plate slidably engaged with the elongated body and disposed in the slot. The method also includes engaging a wheel entering the central channel through the entry end with the shuttle, pushing the shuttle along the central channel with the wheel, the wheel having a rolling engagement with the shuttle and rolling along the base plate of the elongated body along the central channel, and disengaging the shuttle from the wheel adjacent the exit end; wherein the rolling engagement between the shuttle and the wheel cleans the wheel.

In yet another aspect, the disclosure describes a wheel cleaner that includes an elongated body having a slot, a roller rotatably mounted on the elongated body along the slot, a cleaning cartridge disposed in the slot, and a drive mechanism having an actuator associated with the elongated body, wherein activation of the actuator operates to power rotation of the roller. A wheel is adapted to rest within the slot in contact with the cleaning cartridge and the roller. Rotation of the roller causes the wheel to rotate in place while contacting the cleaning cartridge for cleaning the wheel.

In yet another aspect, the disclosure describes a cleaning pad configured to clean a wheel, including an elongated body portion made of a resilient material. The body portion includes a central portion having a first height and a pair of opposed terminal ends. The terminal ends have a second height, wherein the first height is greater than the second height. In addition, The body portion may be configured to absorb cleaning fluid. The body portion may be constructed of a foam material or non-woven material. The cleaning pad may further includes an outer portion attached to the body portion, the outer portion including one or more of a cloth material, a textile, or a microfiber material. The cleaning pad may further include a backing material position on the body portion opposite the outer portion, and is attached to the mounting plate by one of thermal bonding, radio frequency welding, an adhesive, hook and loop attachment, a loop and clip device, a lamination, or pockets sized and shaped to attach the pad to the mounting plate. The body portion and attached outer portion, at the terminal ends may be formed into a U shape to form a protrusion on each of the terminal ends.

BRIEF DESCRIPTION OF THE SEVERAL VIEWS OF THE DRAWING(S)

Figure 2:
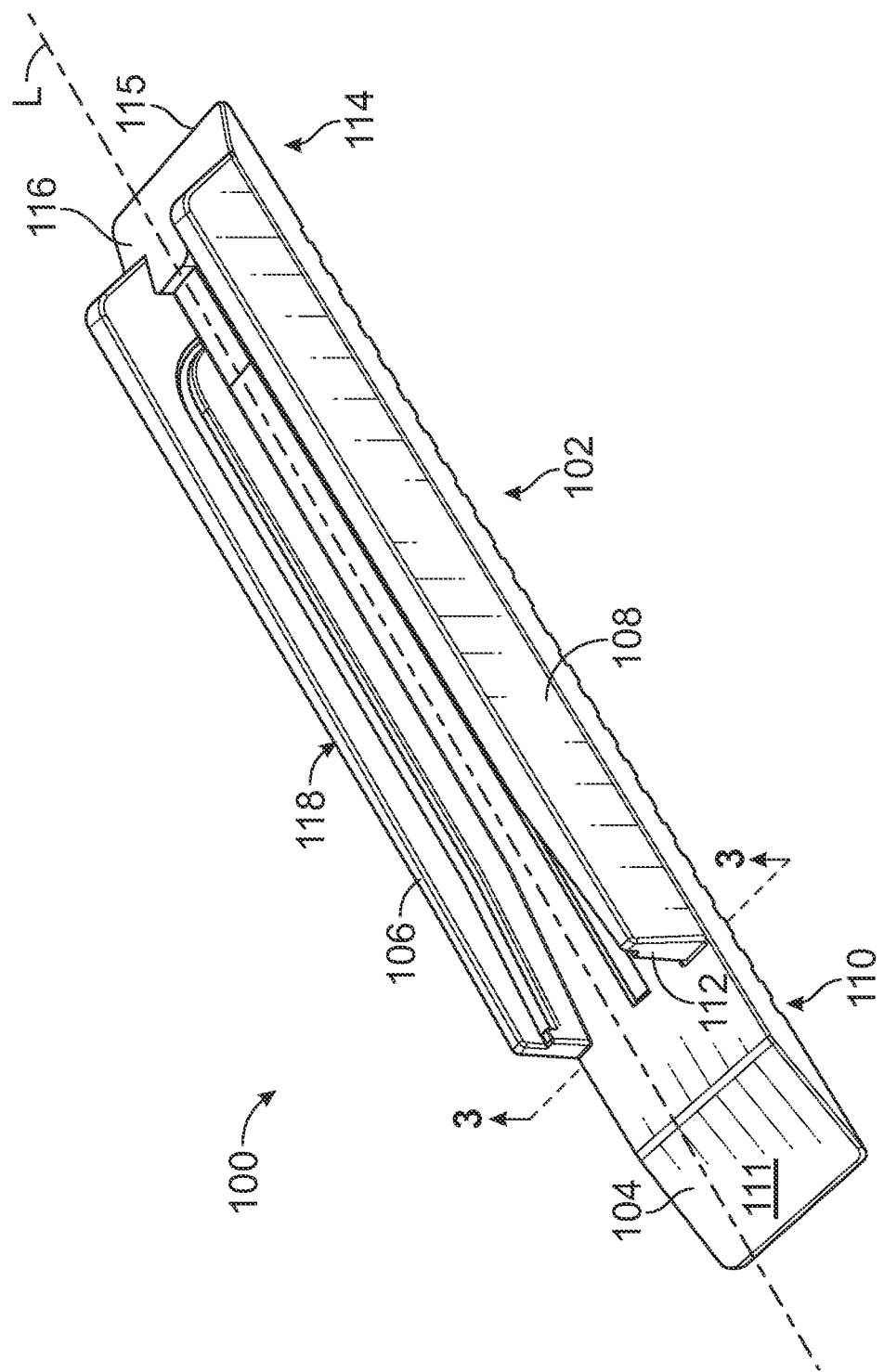
FIG. 2 is a perspective view of an elongated body of the wheel cleaner of FIG. 1.
Figure 3:
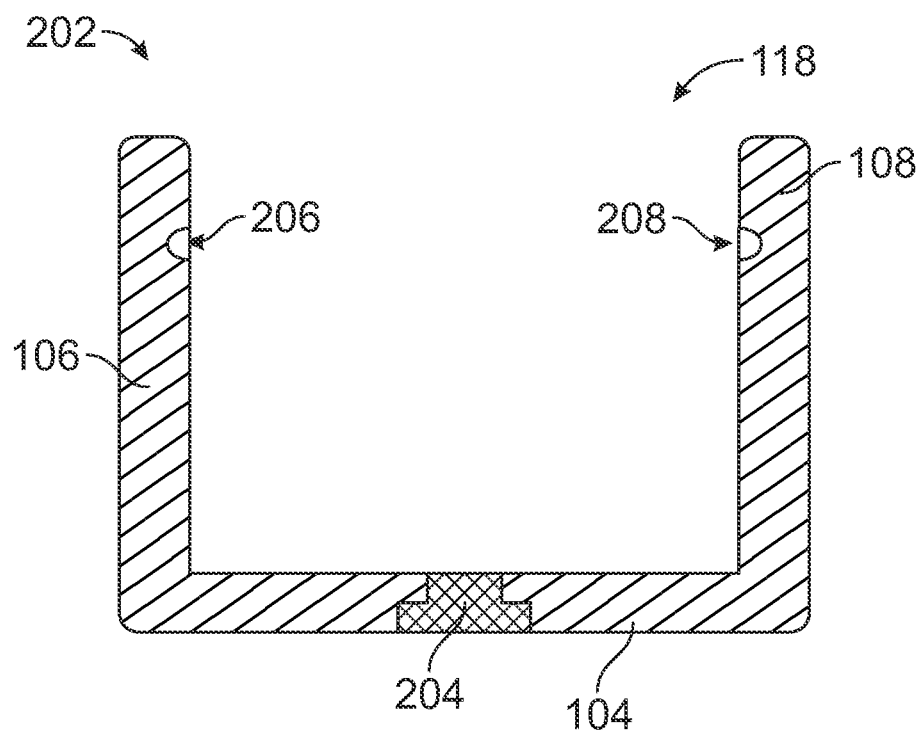

FIG. 3 cross-section view through the elongated body of FIG. 2.

Figure 4:
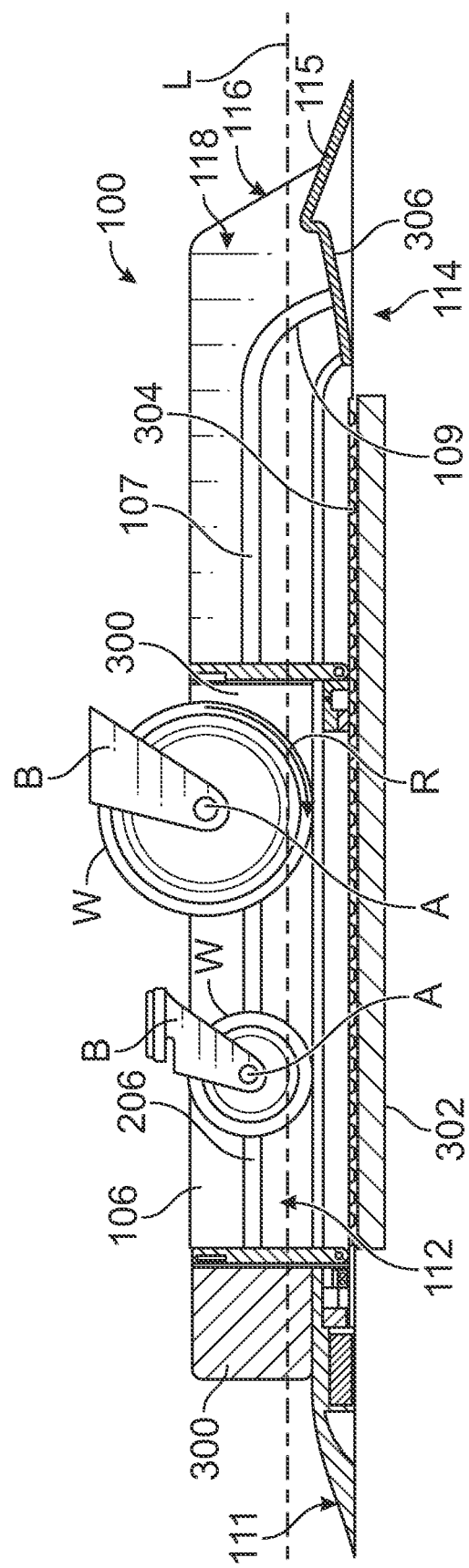

FIG. 4 is a front-to-back cross-section view of the wheel cleaner during operation in accordance with the disclosure.

Figure 5:
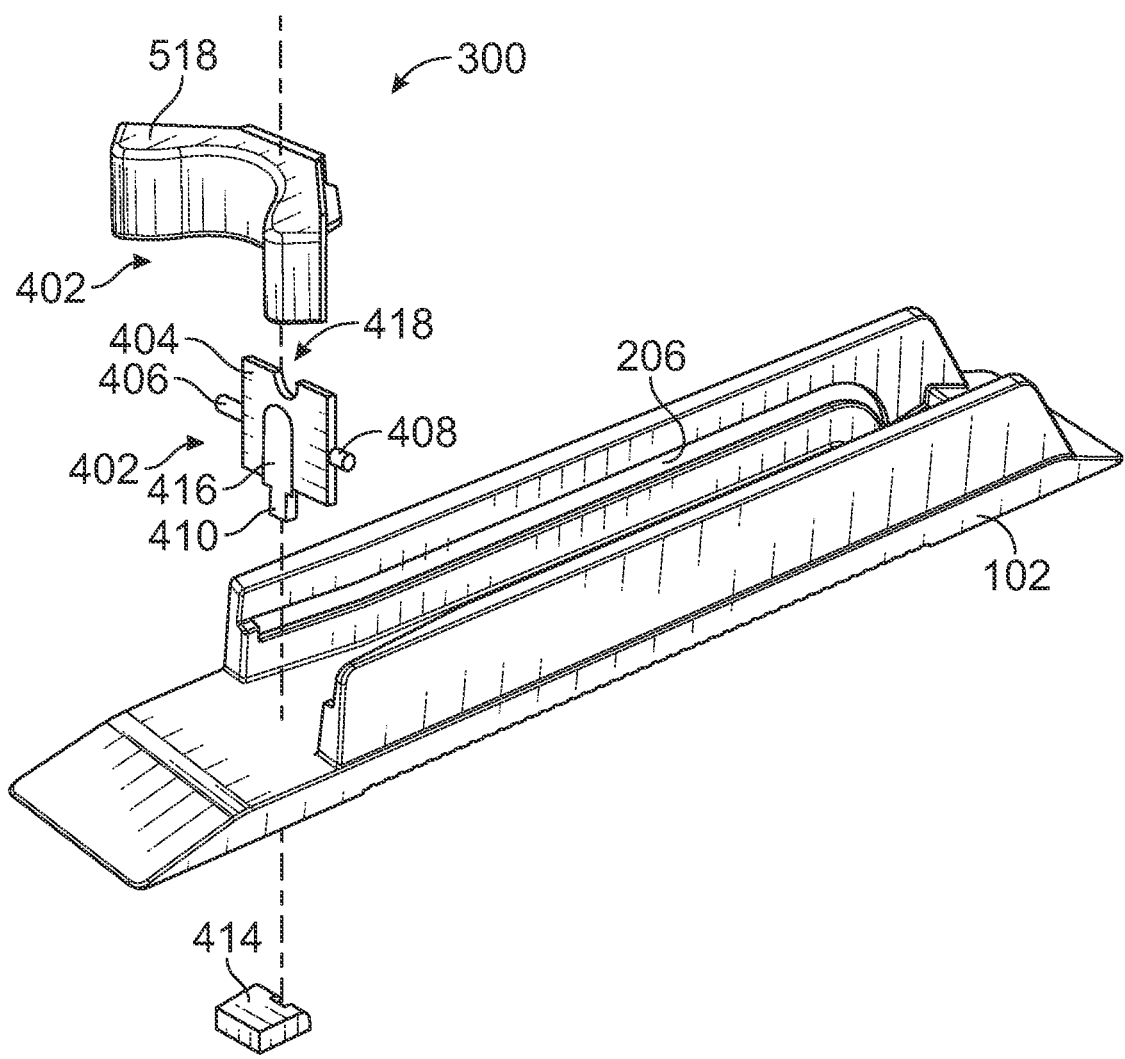

FIG. 5 is an exploded view of a shuttle for use with a wheel cleaner in accordance with the disclosure.

Figure 6:
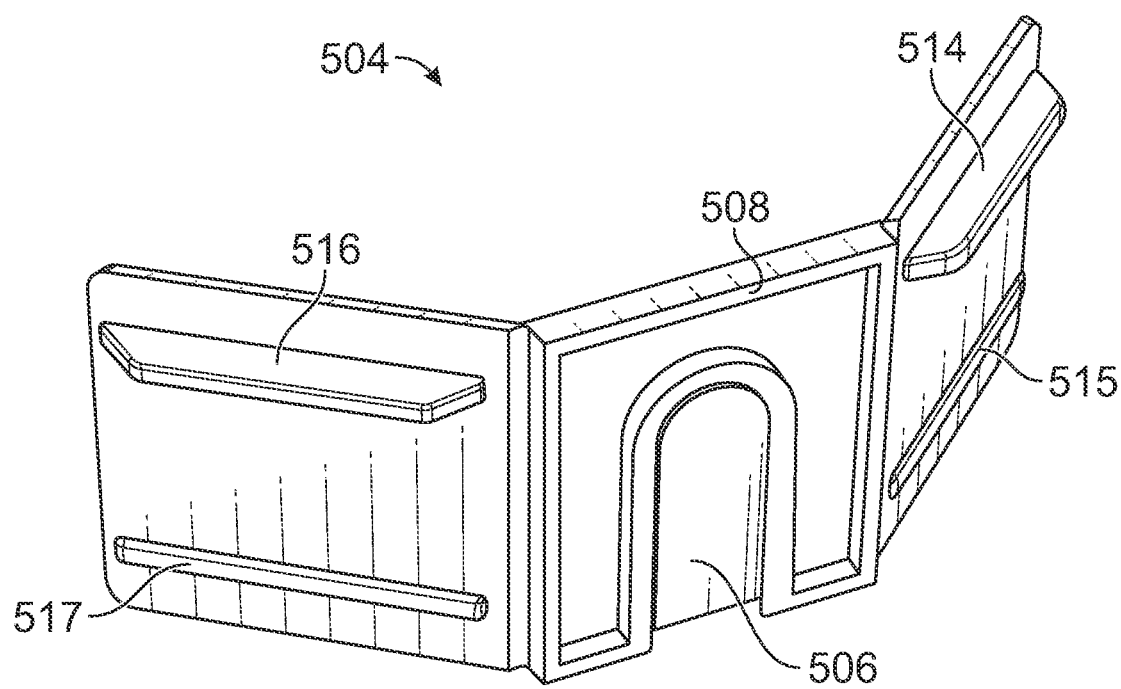

FIG. 6 is a rear view of a cleaning cartridge holder for use with a wheel cleaner in accordance with the disclosure.

Figure 7:
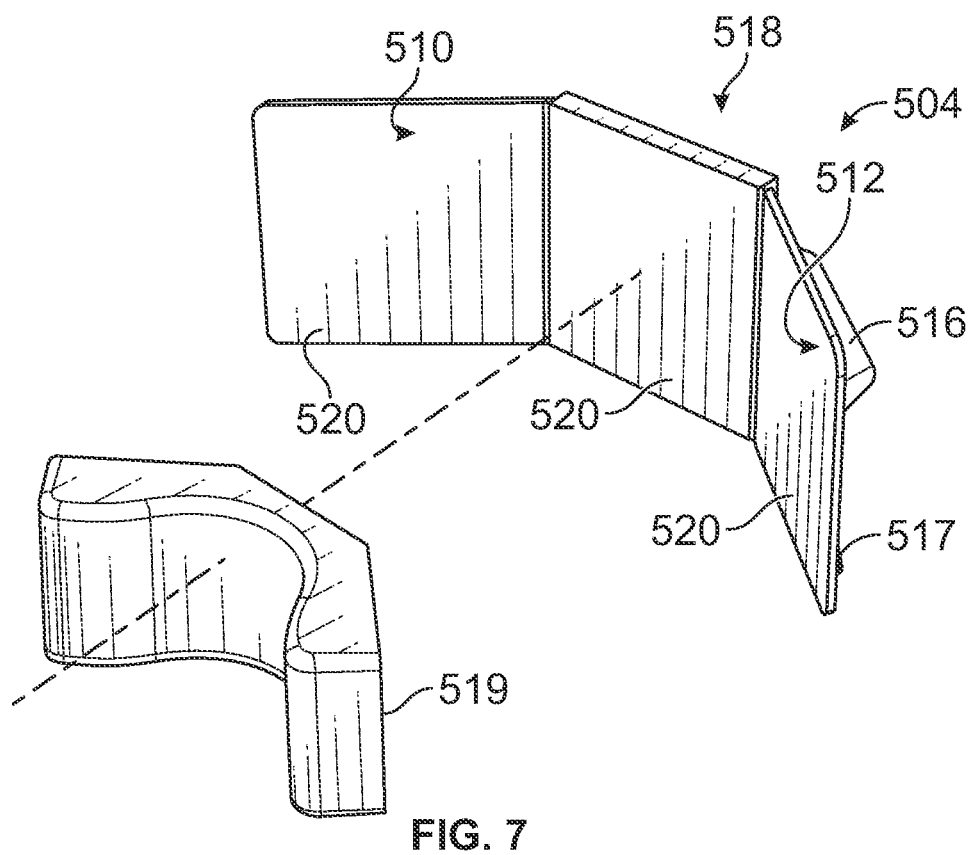

FIG. 7 is an exploded view of a cleaning cartridge assembly in accordance with the disclosure.

Figure 8:
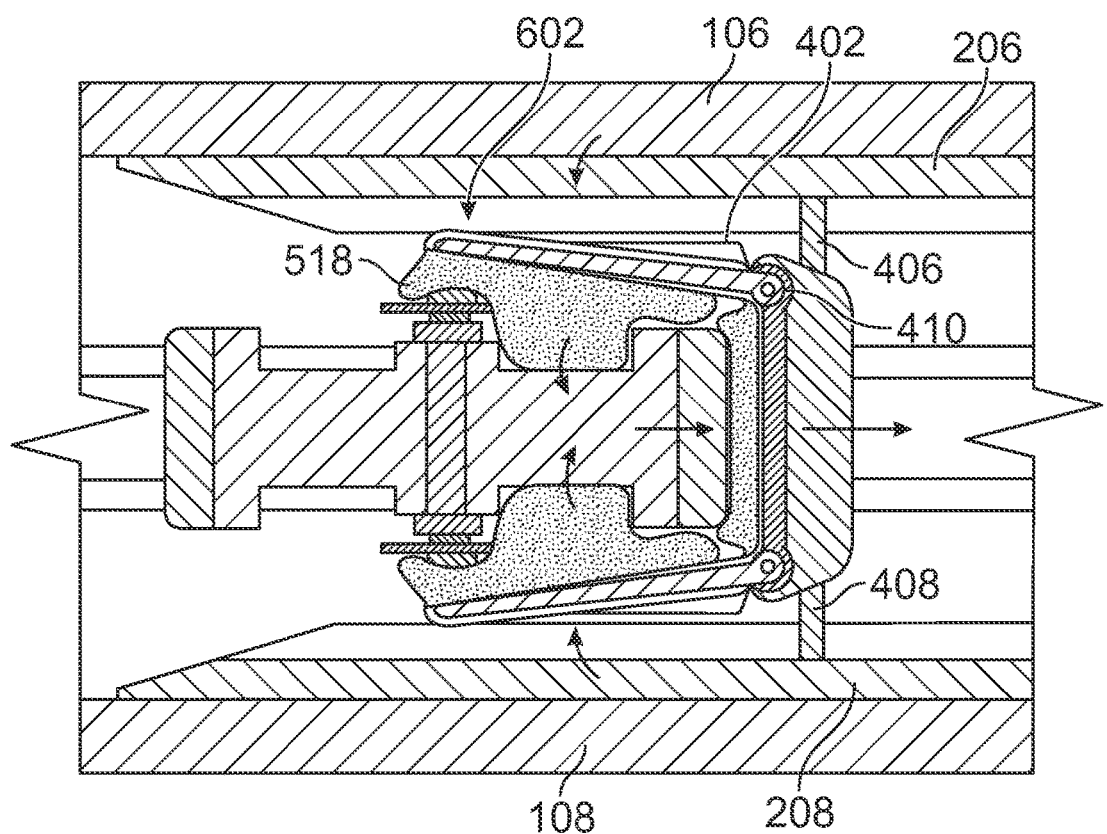

FIG. 8 is a cross section view of a cart wheel engaged in the wheel cleaner shuttle in accordance with the disclosure.

Figure 9:
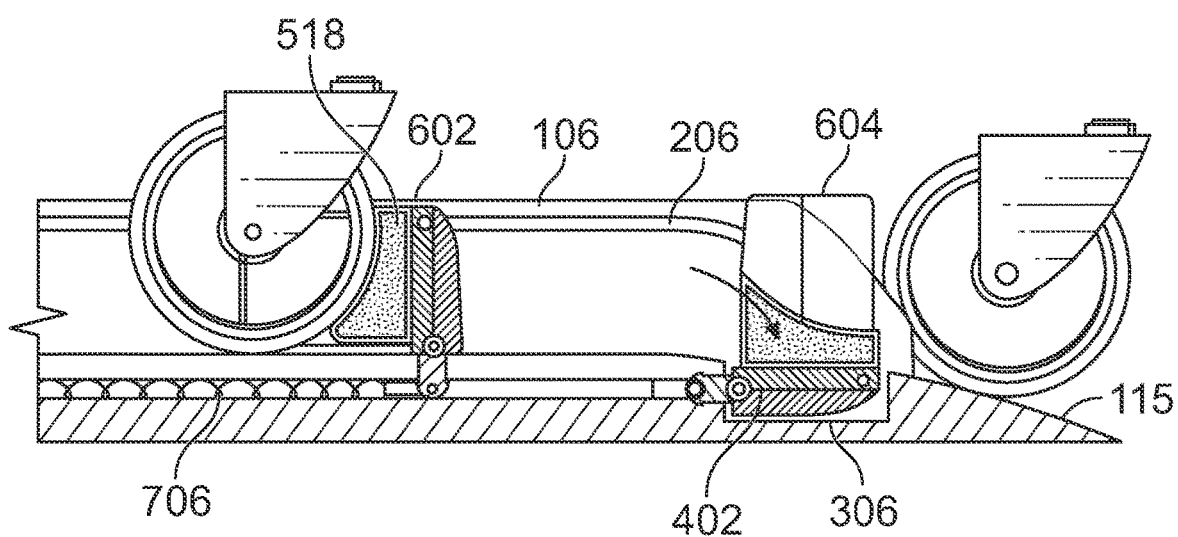

FIG. 9 is a cross section of a cart wheel exiting the wheel cleaner in accordance with the disclosure.

Figure 10:
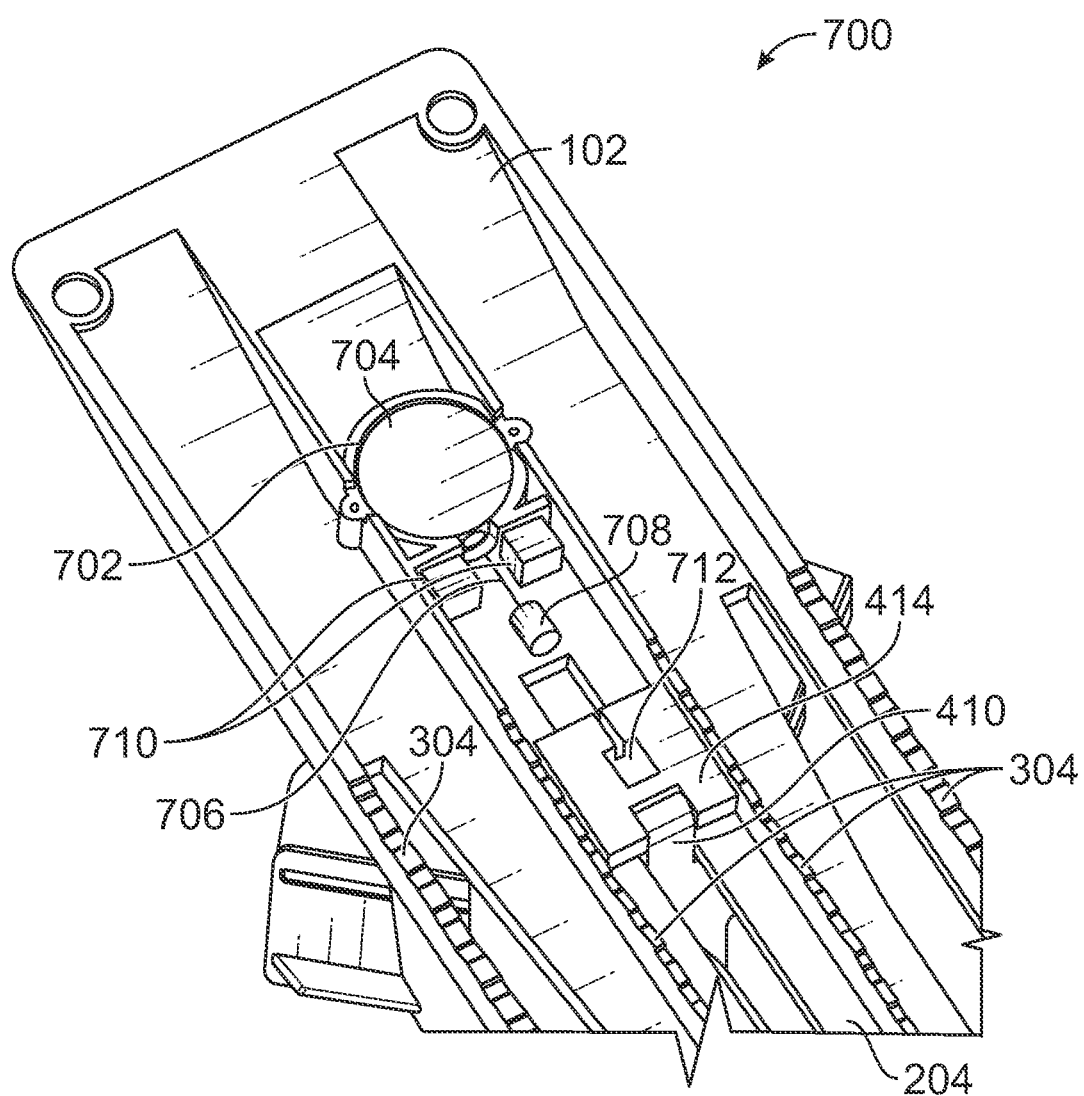

FIG. 10 is a partial, perspective view of a shuttle retraction mechanism for use with the wheel cleaner in accordance with the disclosure.

Figure 11:
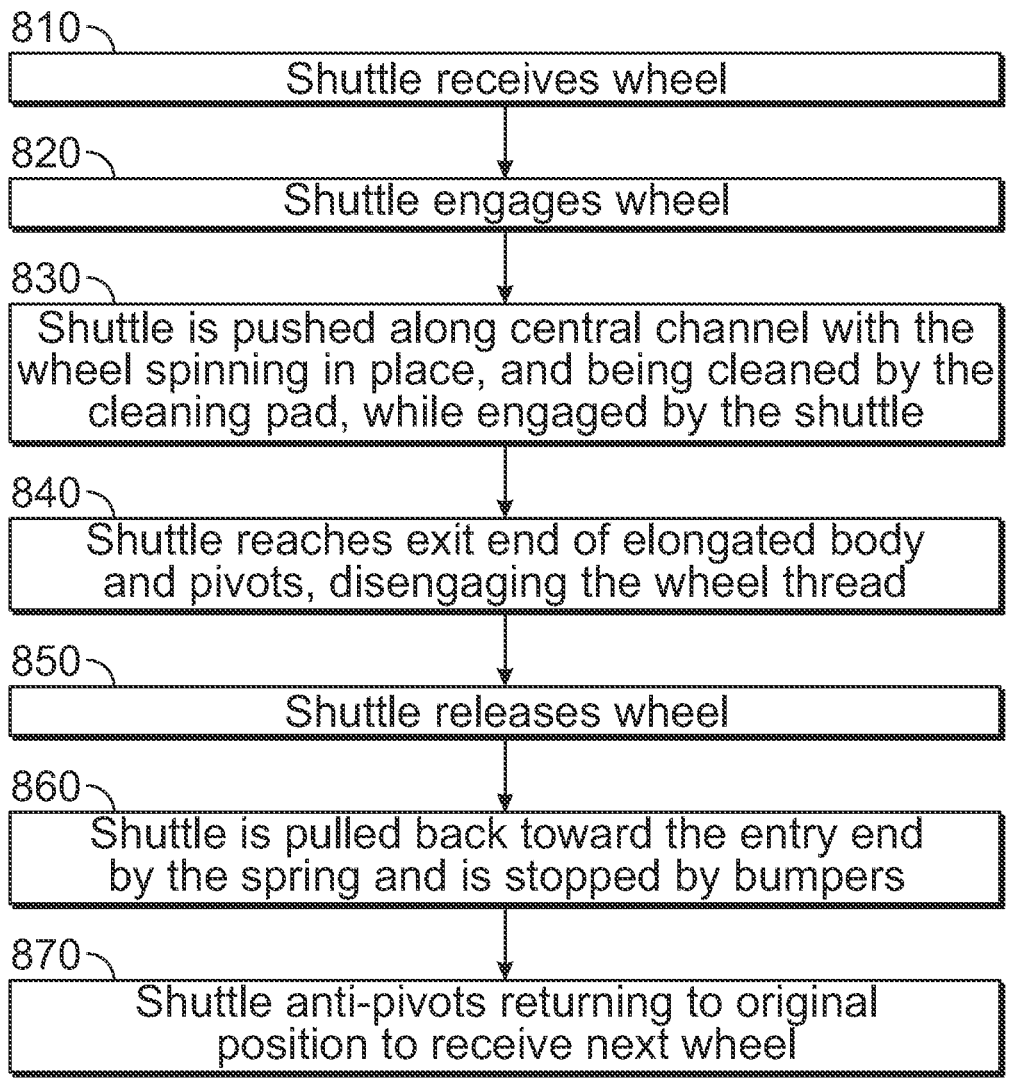

FIG. 11 is a flowchart for a method of operating a wheel cleaner in accordance with the disclosure.

Figure 12:
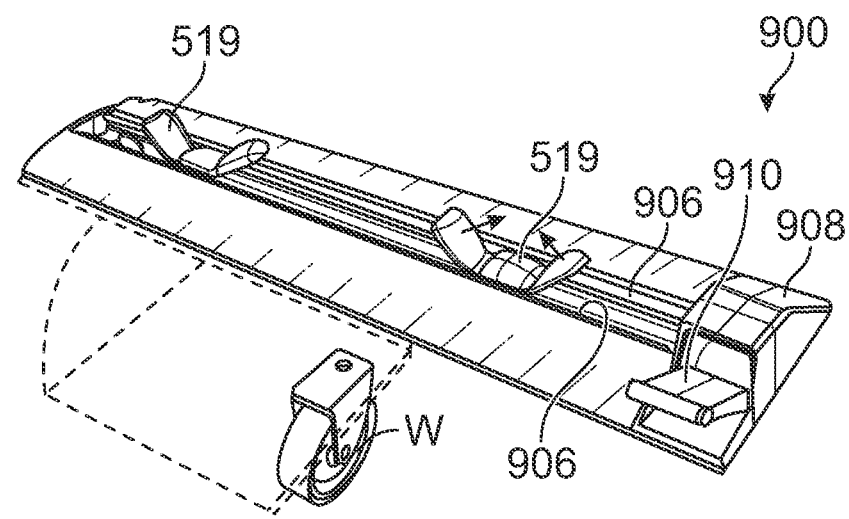

FIG. 12 is a perspective view of a first alternative embodiment of a wheel cleaner in accordance with the disclosure.

Figure 13:
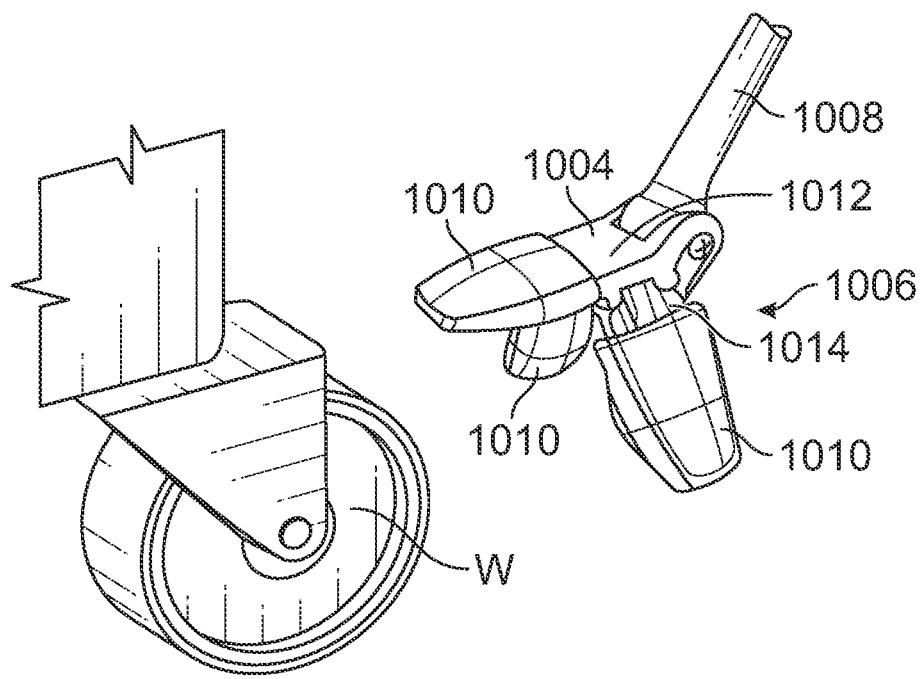

FIG. 13 is a partial, perspective view of a second alternative embodiment of a wheel cleaner in accordance with the disclosure.

Figure 14:
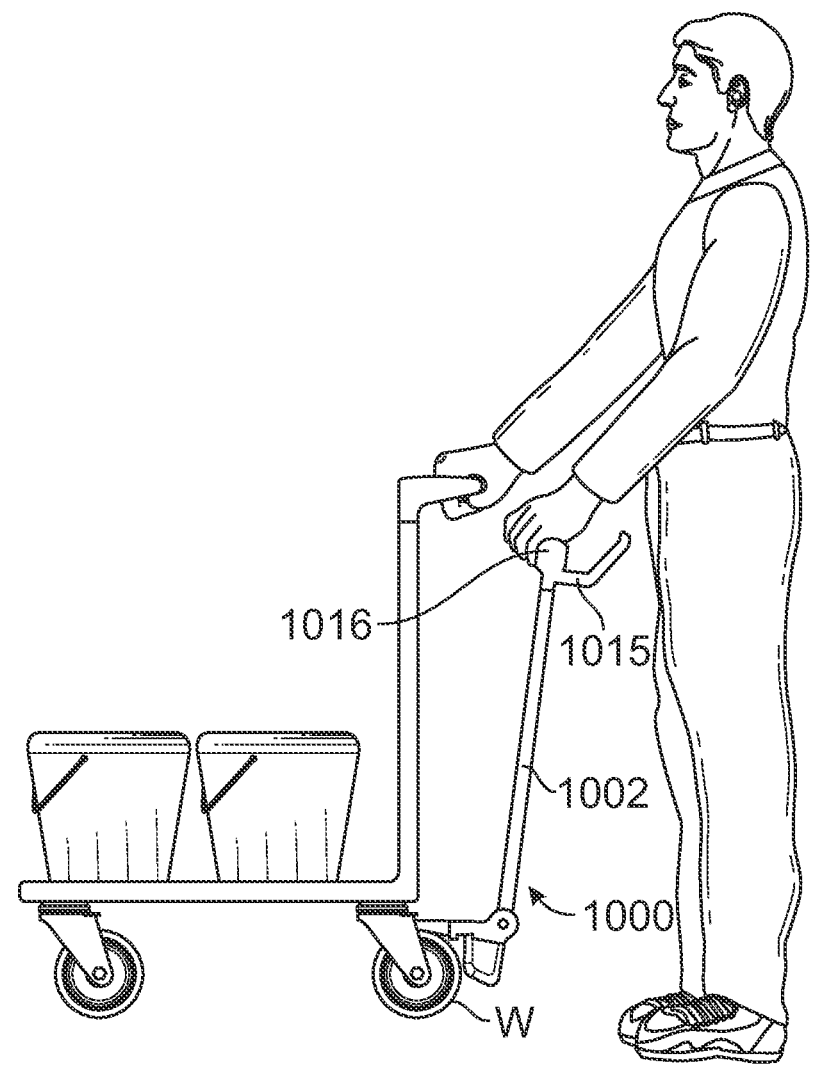

FIG. 14 is a side view of the wheel cleaner embodiment of FIG. 13.

Figure 15:
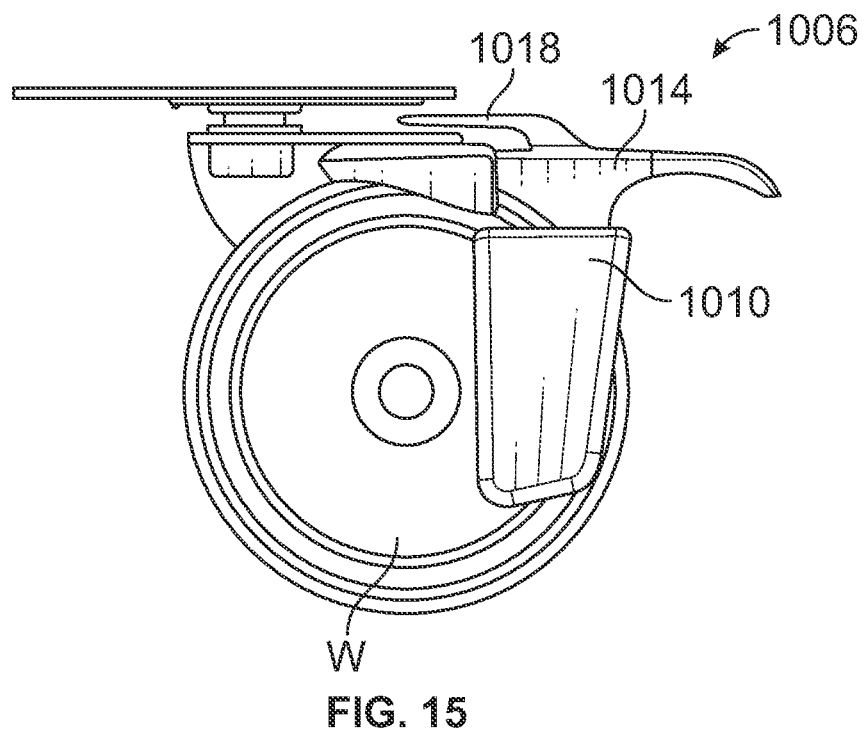

FIG. 15 is a side view of a variation of the wheel cleaner embodiment shown in FIG. 13.

Figure 16A:
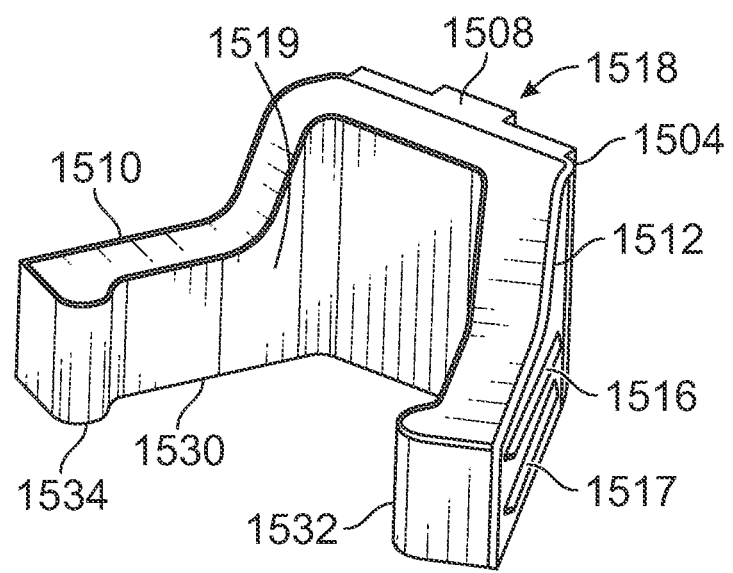

FIG. 16a is an alternative embodiment of a cleaning cartridge according to the disclosure.

Figure 16B:
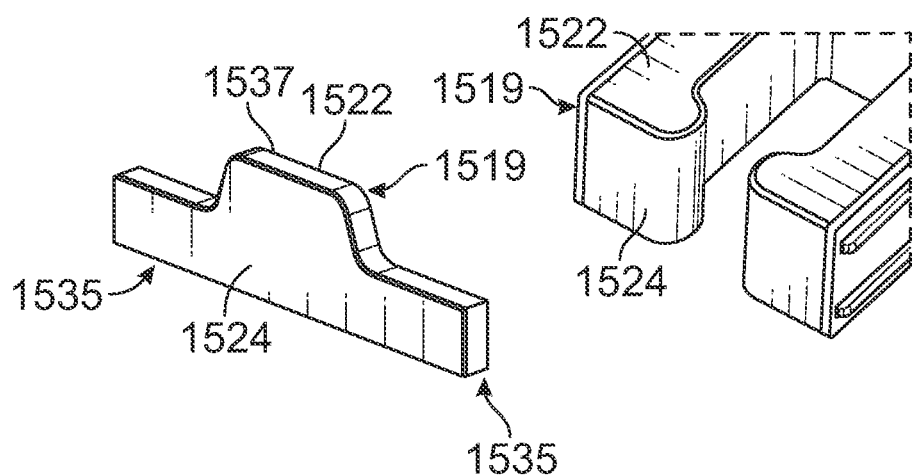

FIG. 16b is an embodiment of a pad portion of the cleaning cartridge of FIG. 16a.

Figure 17:
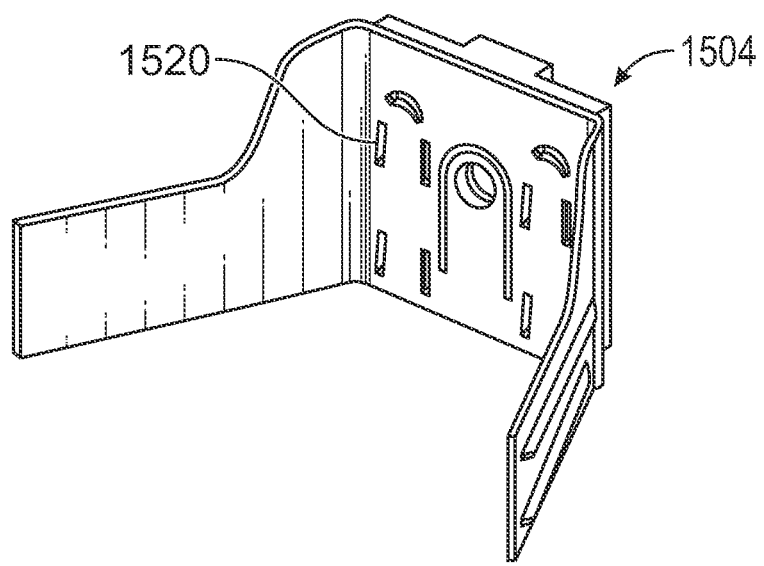

FIG. 17 is an alternative embodiment of a base plate for use with a wheel cleaner in accordance with the disclosure.

Figure 18:
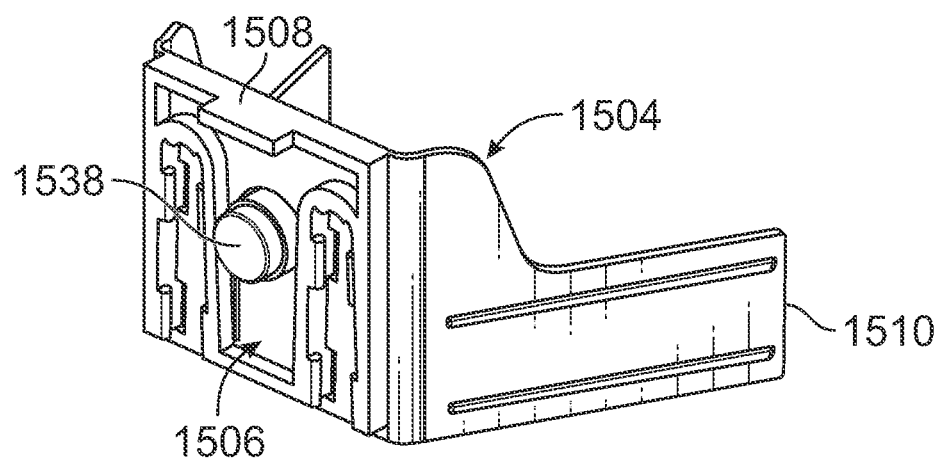

FIG. 18 is the base plate of FIG. 17 showing an attachment portion.

Figure 19:
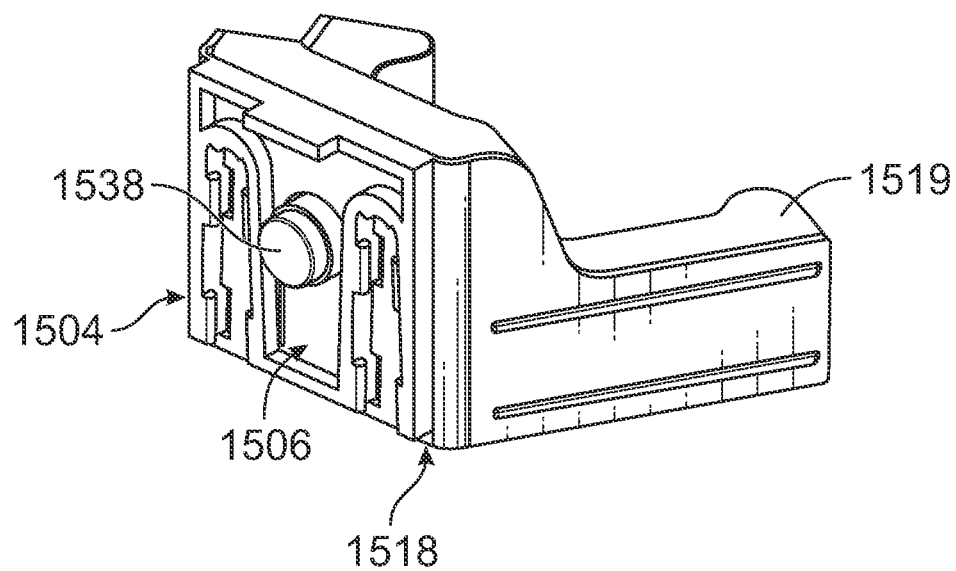

FIG. 19 is the cartridge of FIG. 16a shown from the back side.

Figure 20:
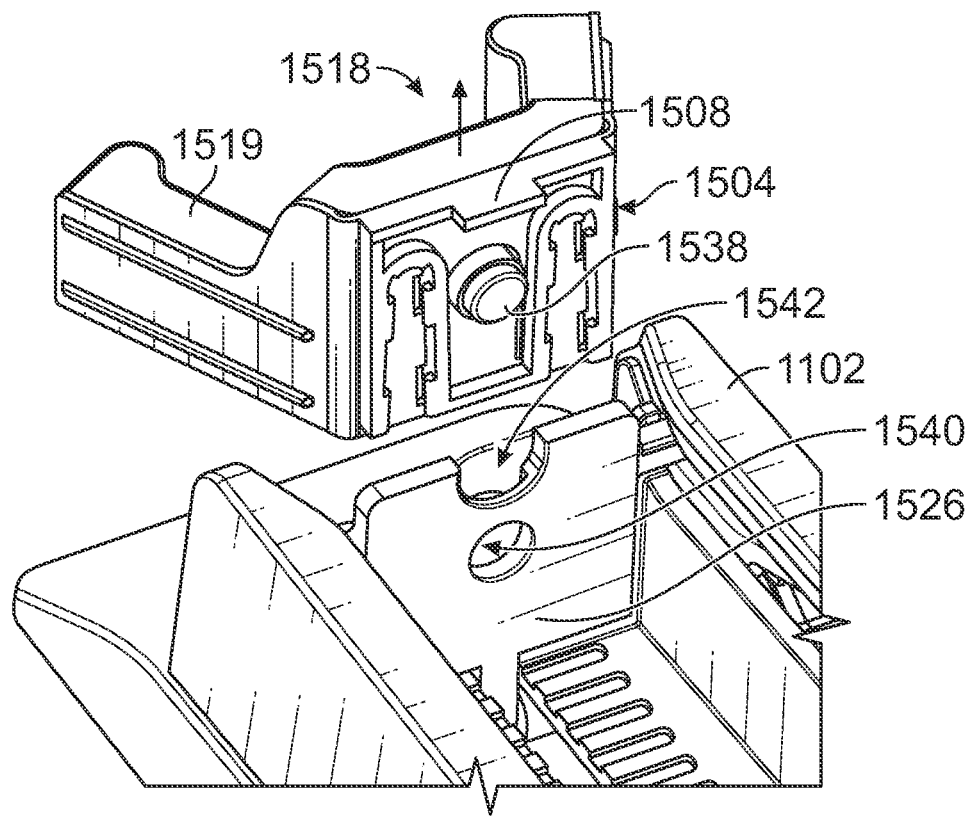

FIG. 20 is a back side view of the attachment of the cleaning cartridge of FIG. 16a to a shuttle.

Figure 21:
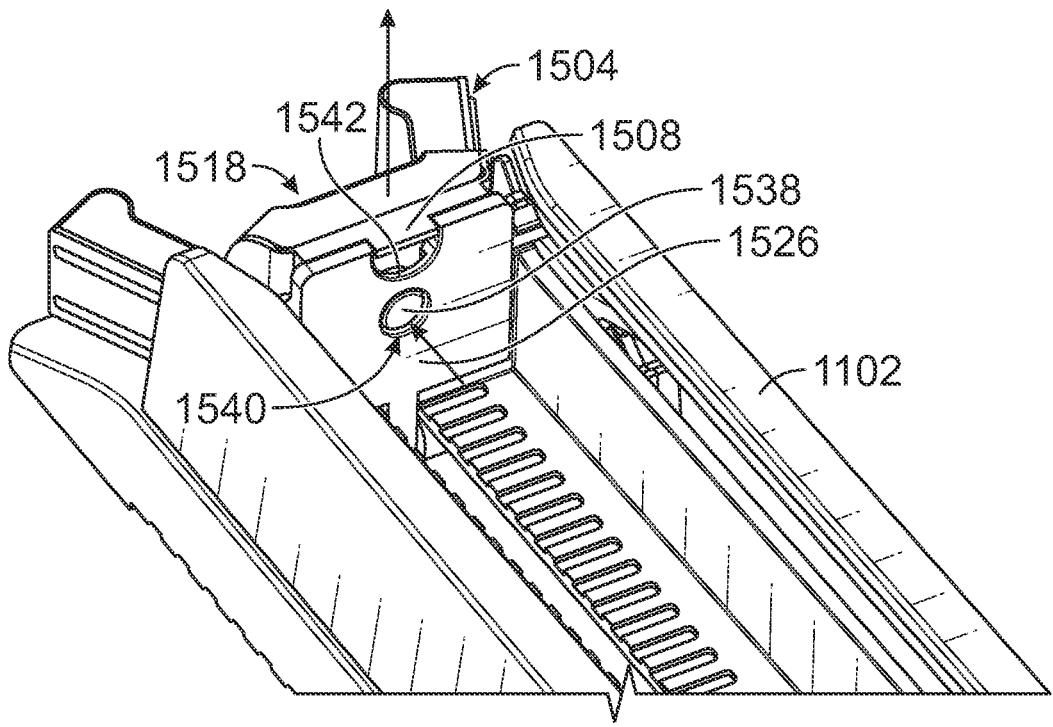

FIG. 21 is a back side view of the detachment of the cleaning cartridge of FIG. 16a from a shuttle.

Figure 22:
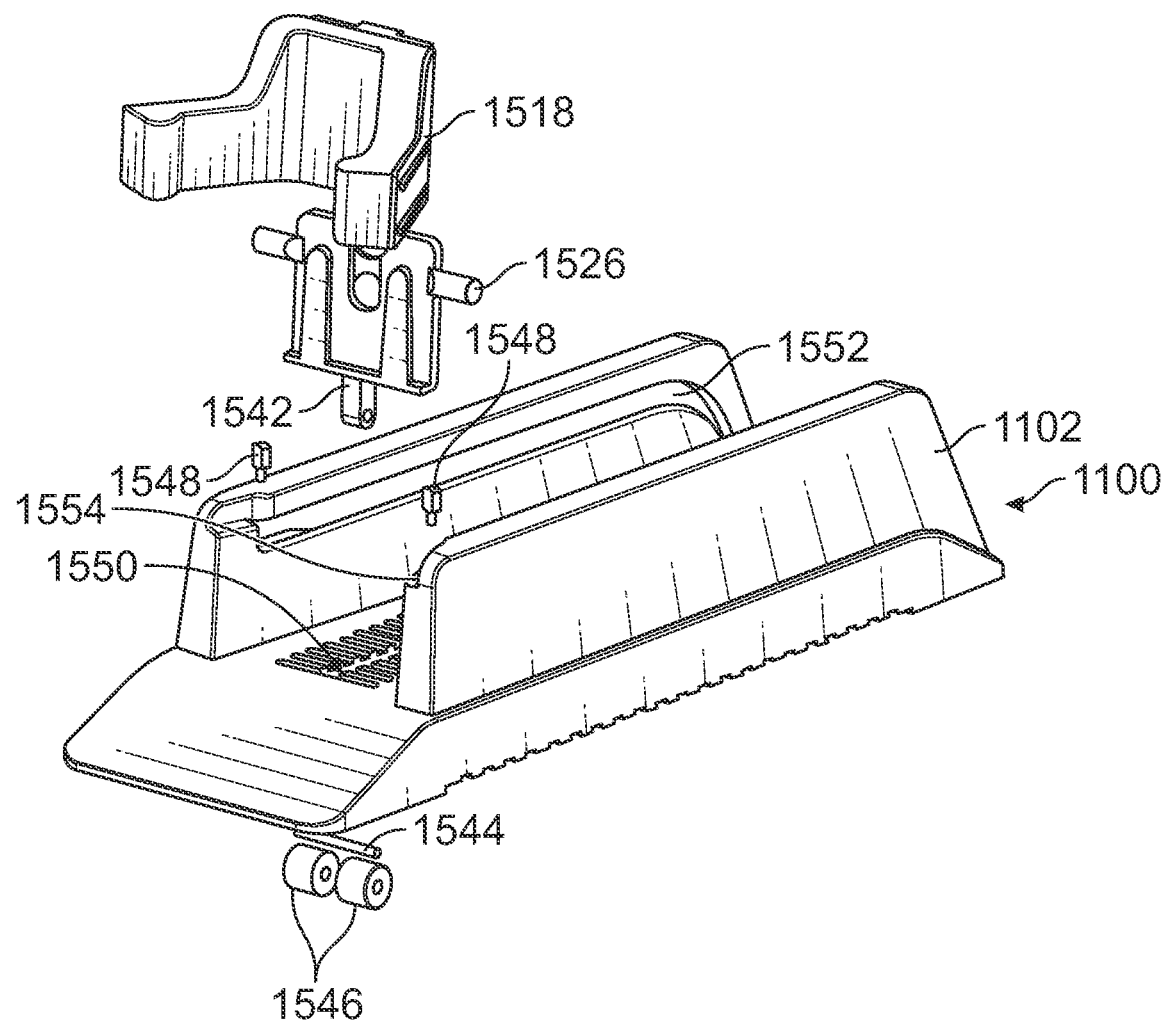

FIG. 22 is an exploded view of the cleaning cartridge of FIG. 16a, a shuttle, and body of a wheel cleaner.

Figure 23:
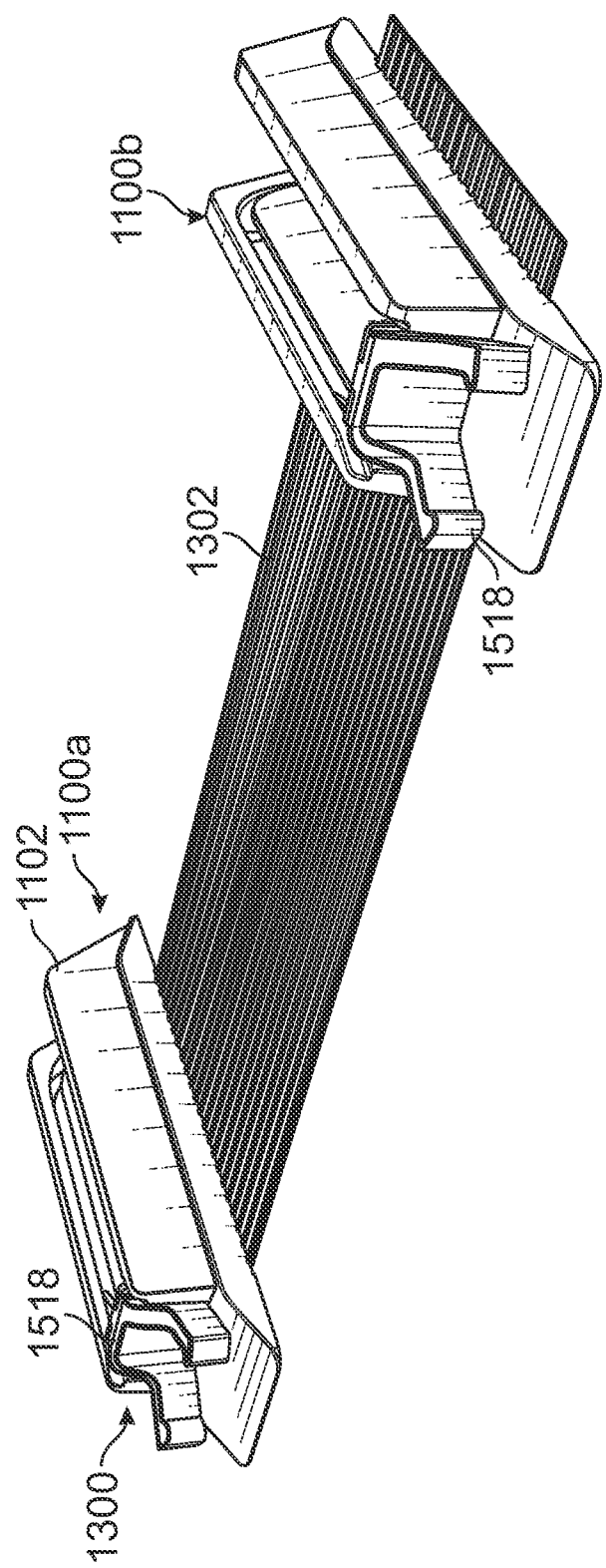

FIG. 23 is a wheel cleaner system with two wheel cleaners in a configuration to receive a wheeled conveyance for cleaning having at least a pair of laterally spaced apart wheels.

Figure 24:
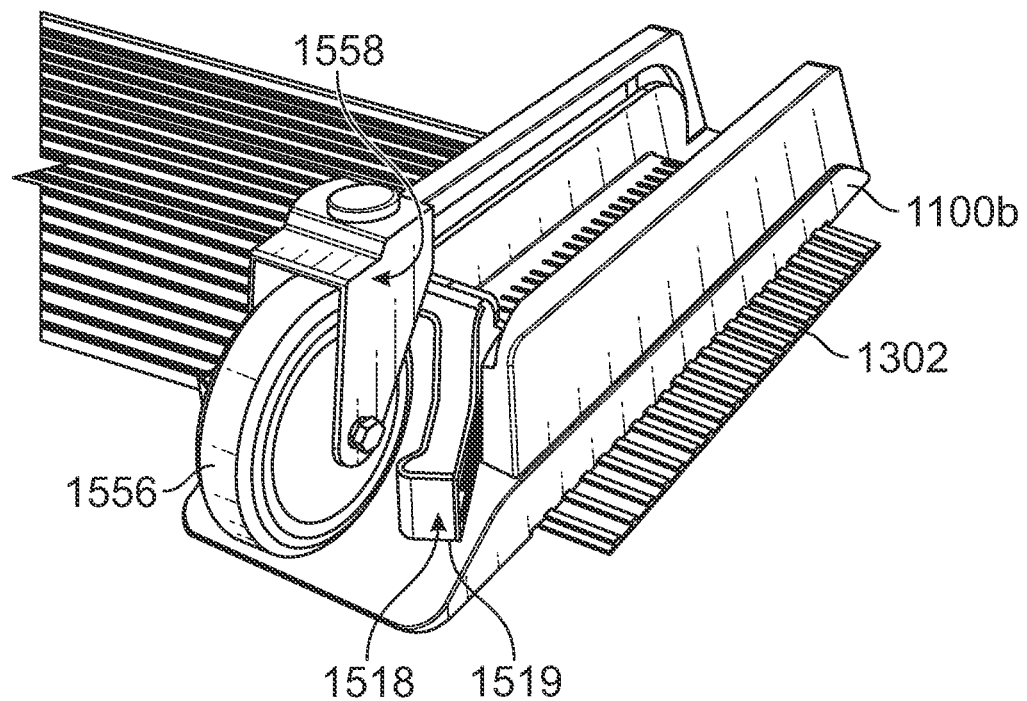

FIG. 24 is a representation of a wheel of a conveyance entering a wheel cleaner according to the disclosure.

Figure 25:
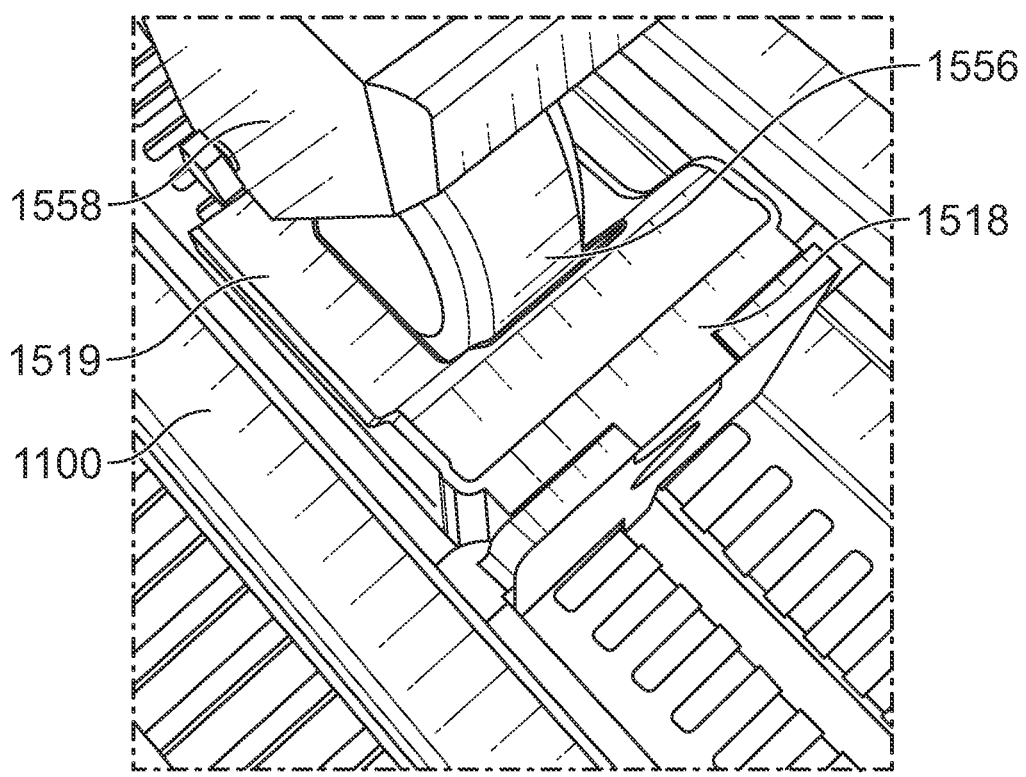

FIG. 25 is a top perspective representation of a wheel being contacted by a wheel cleaner according to the disclosure after entering.

Figure 26:
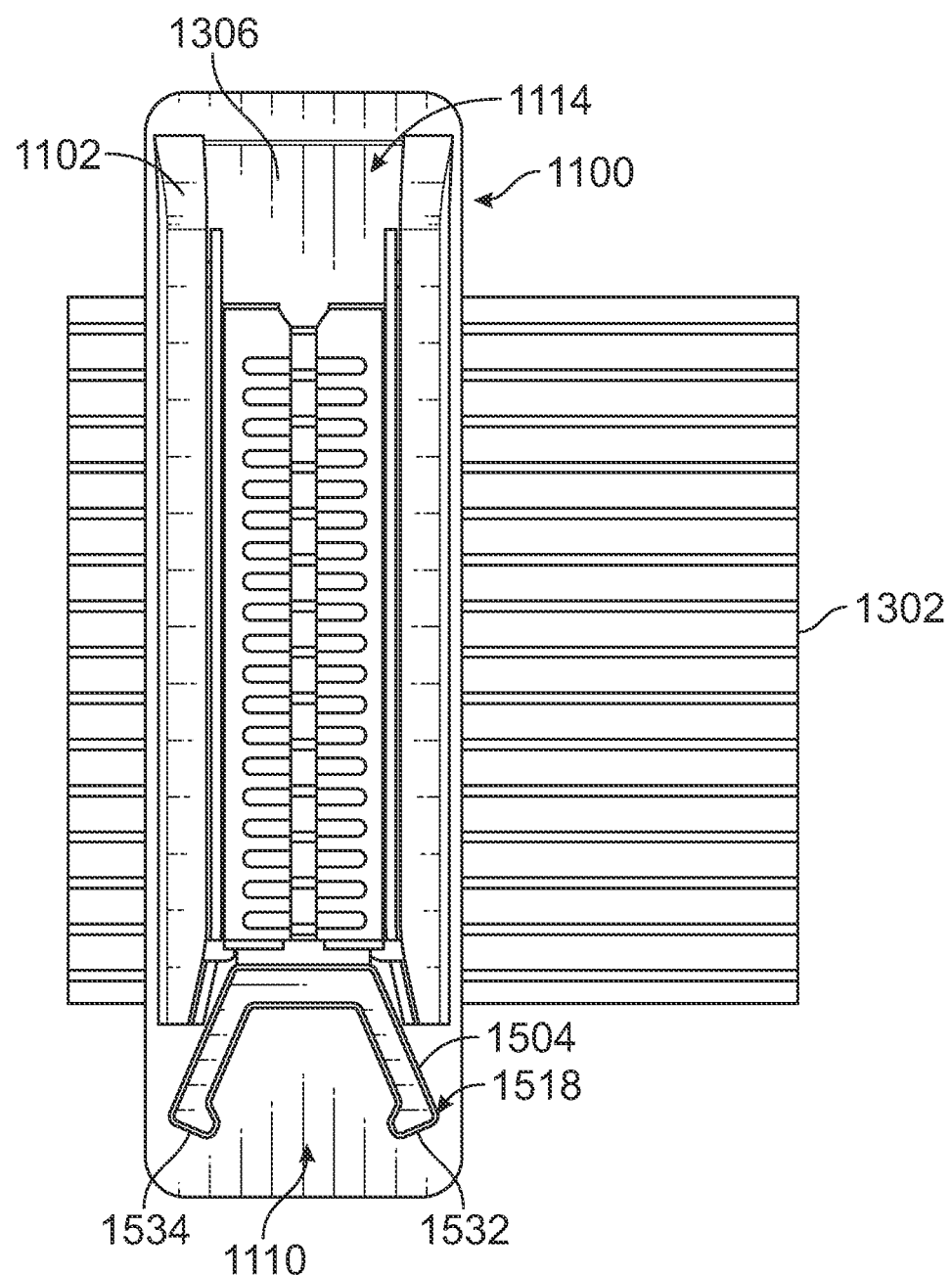

FIG. 26 is a top view of a wheel cleaner before a wheel enters.

Figure 27:
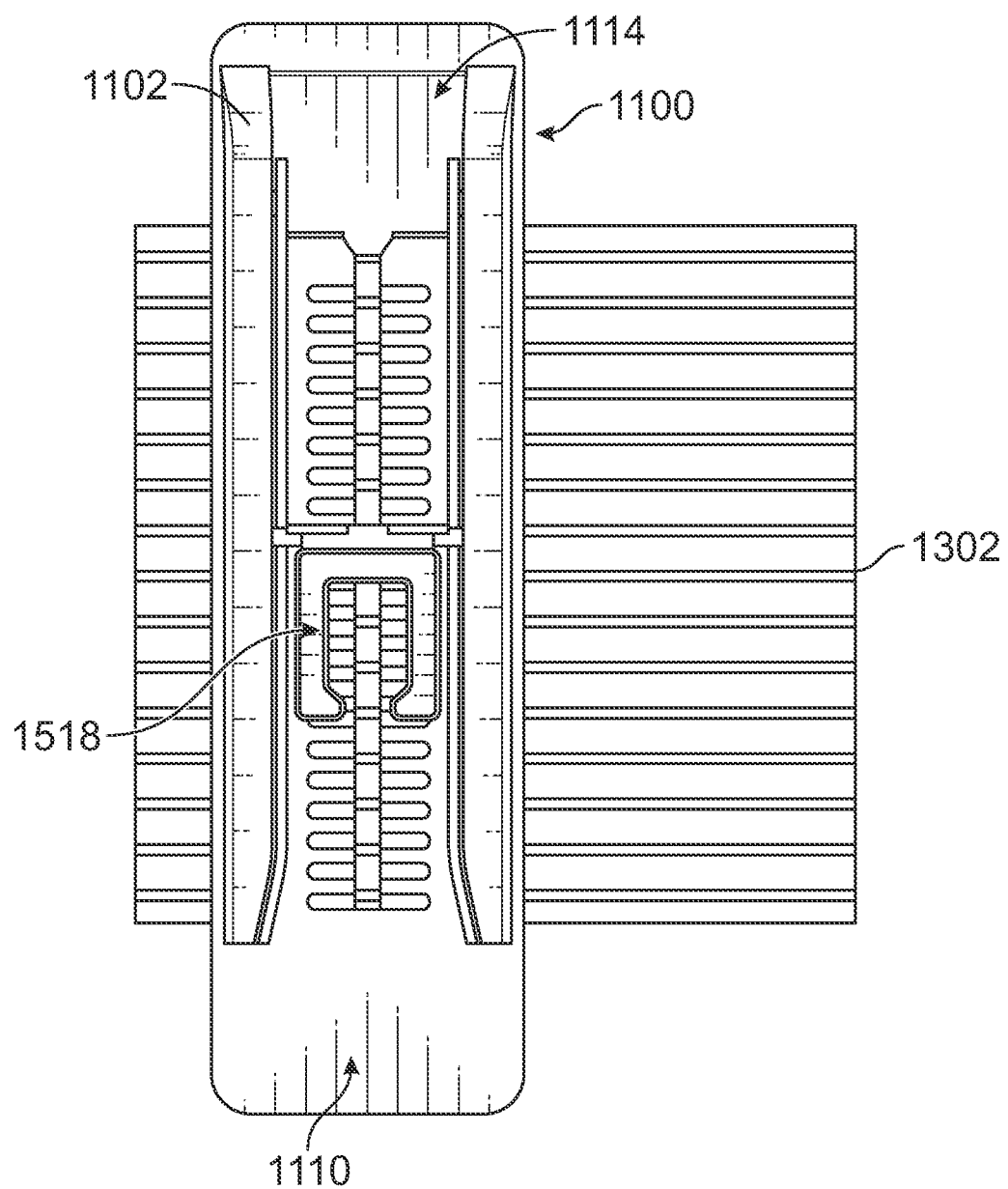

FIG. 27 is a top view of the wheel cleaner of FIG. 26 after a wheel enters.

Figure 28:
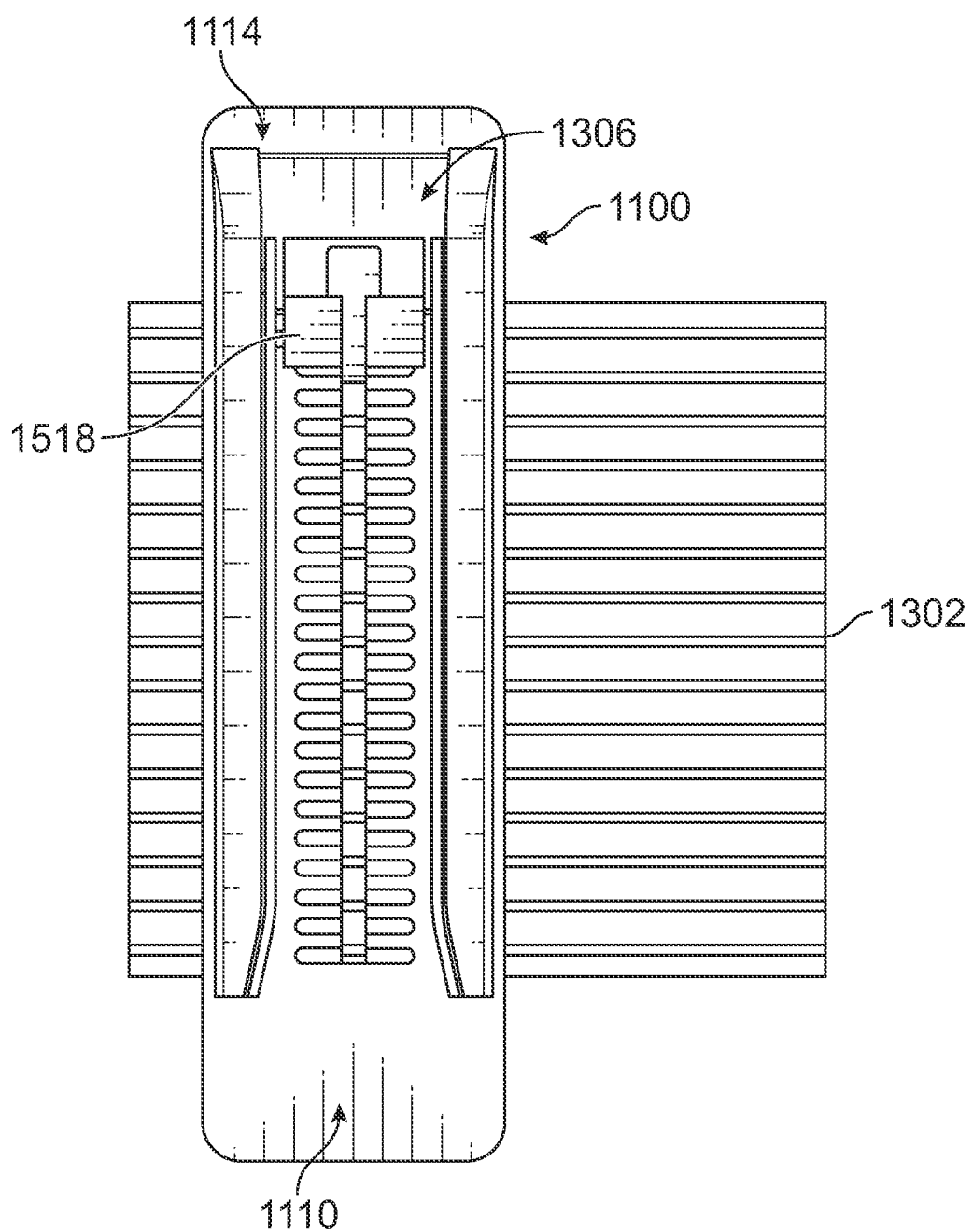

FIG. 28 is a top view of the wheel cleaner of FIG. 26 as a wheel exits.

Figure 29:
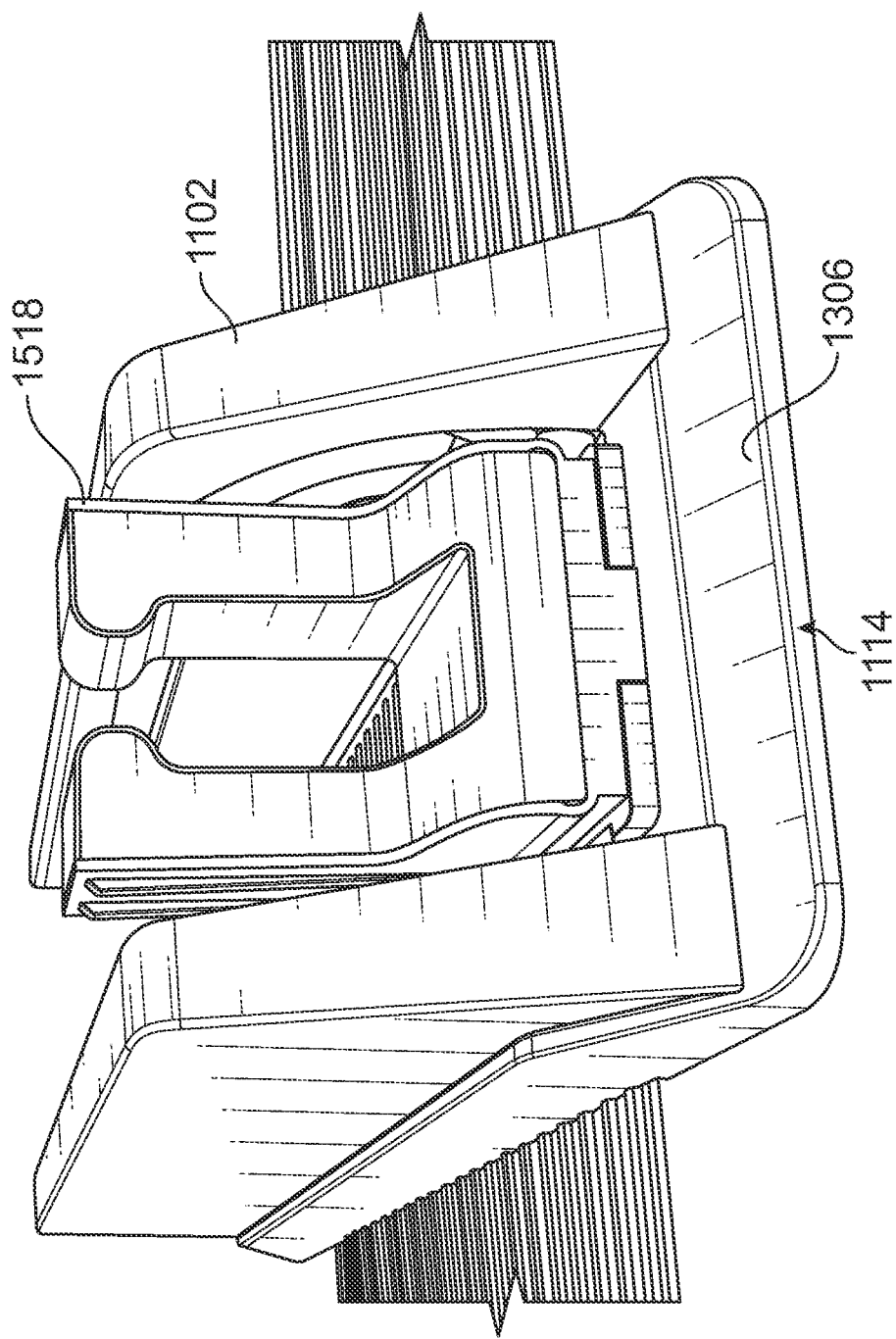

FIG. 29 is a back side view of the wheel cleaner of FIG. 28.

Figure 30:
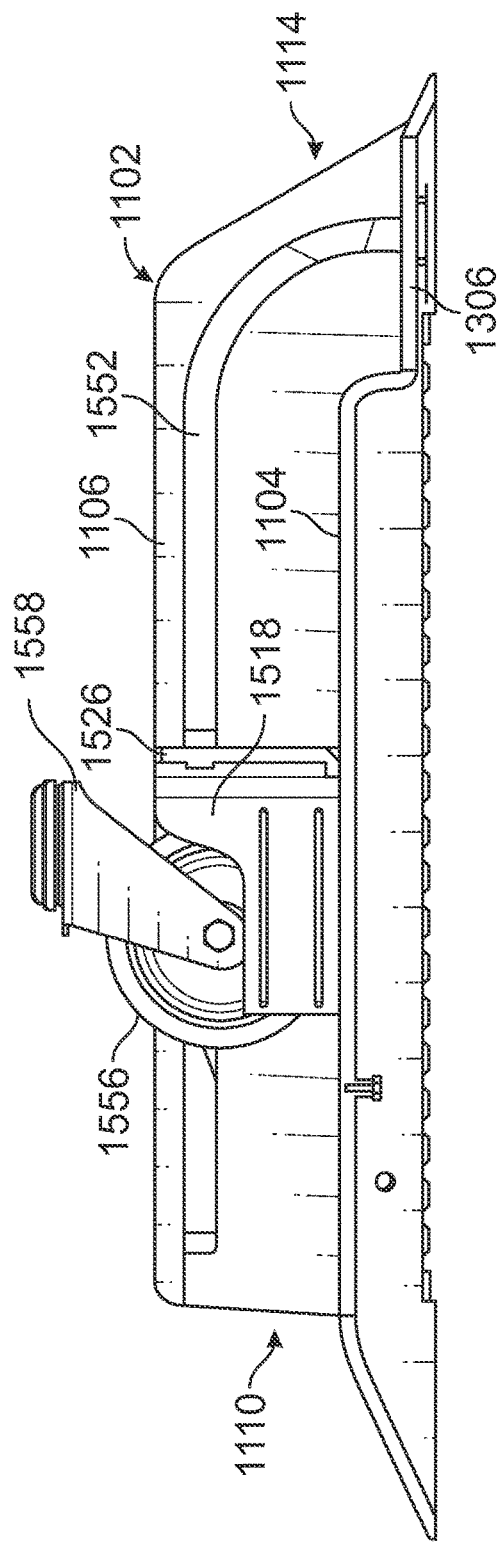

FIG. 30 is a cut away side view of the wheel cleaner of FIG. 27 with a wheel engaged.

Figure 31:
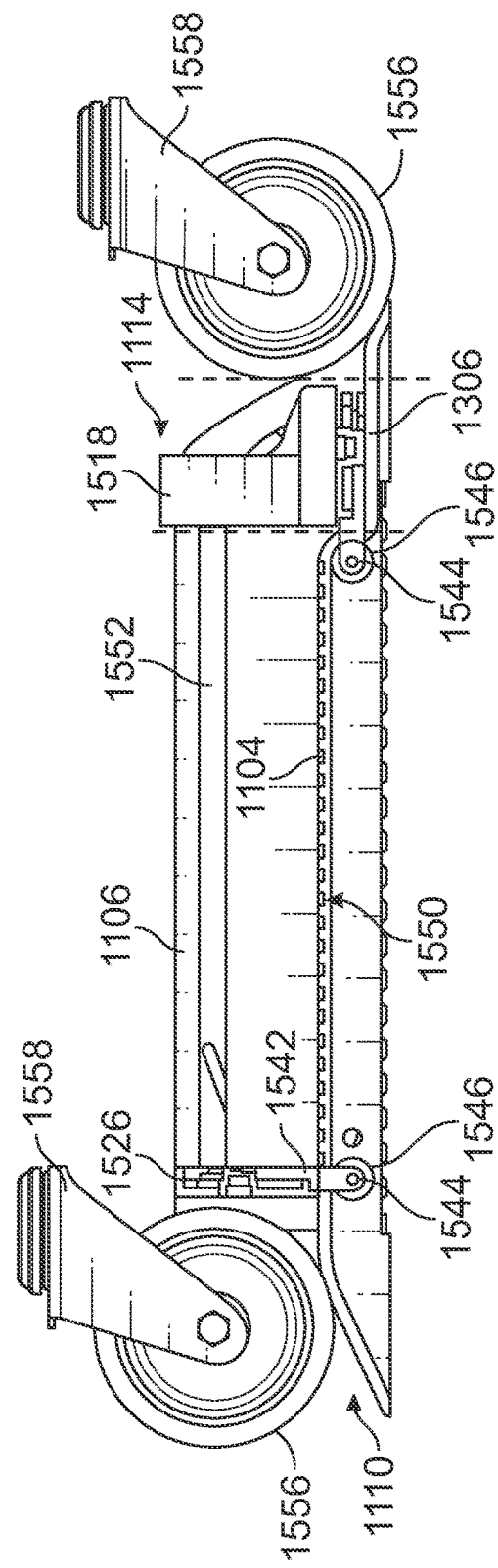

FIG. 31 is a cut away side view of a wheel cleaner with front and rear wheels of a conveyance in position.

Figure 32:
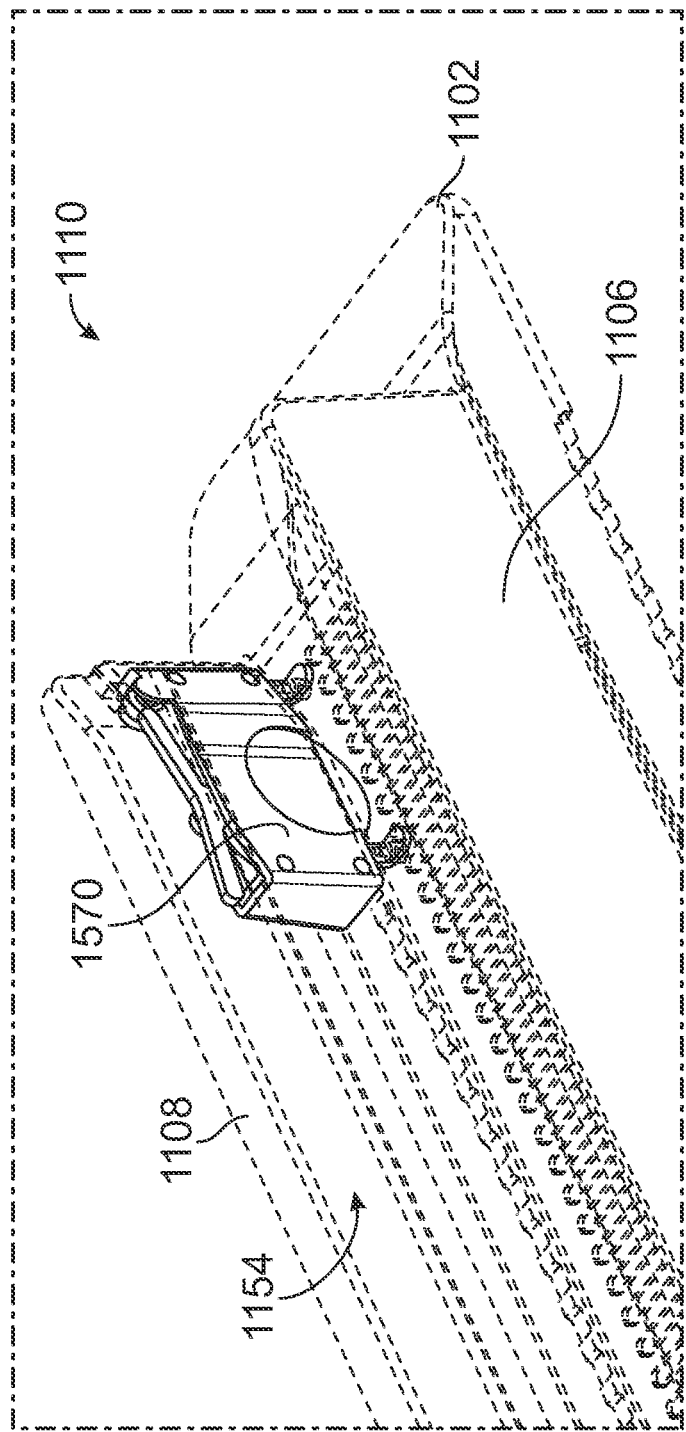

FIG. 32 is a cut away view of a damper unit positioned within a wheel cleaner body.

Figure 33:
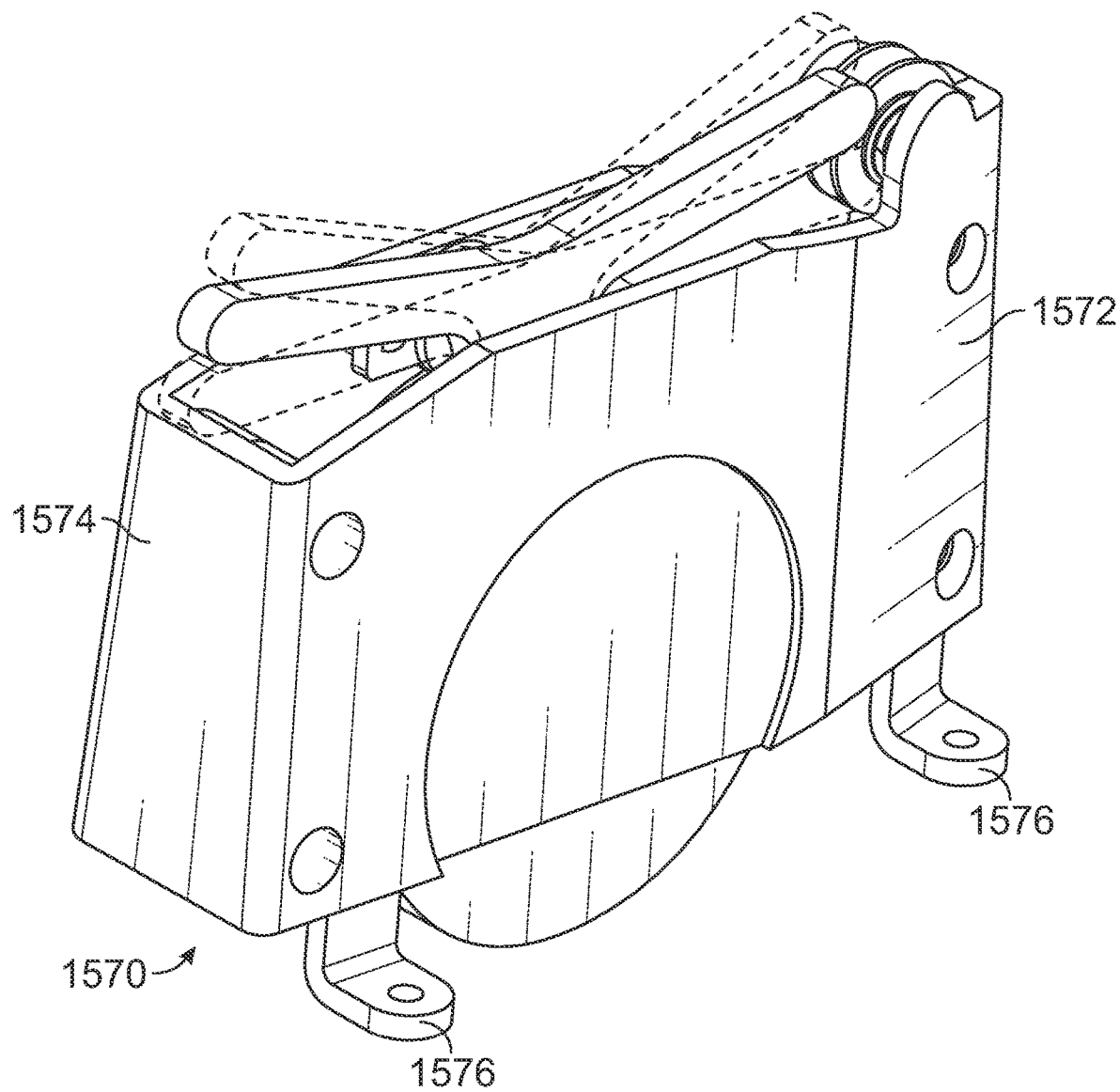

FIG. 33 is a damper unit illustrating positions of a rocker arm thereof configured to contact and dampen the movement of a shuttle as the shuttle is returned to an initial position of the wheel cleaner.

Figure 34:
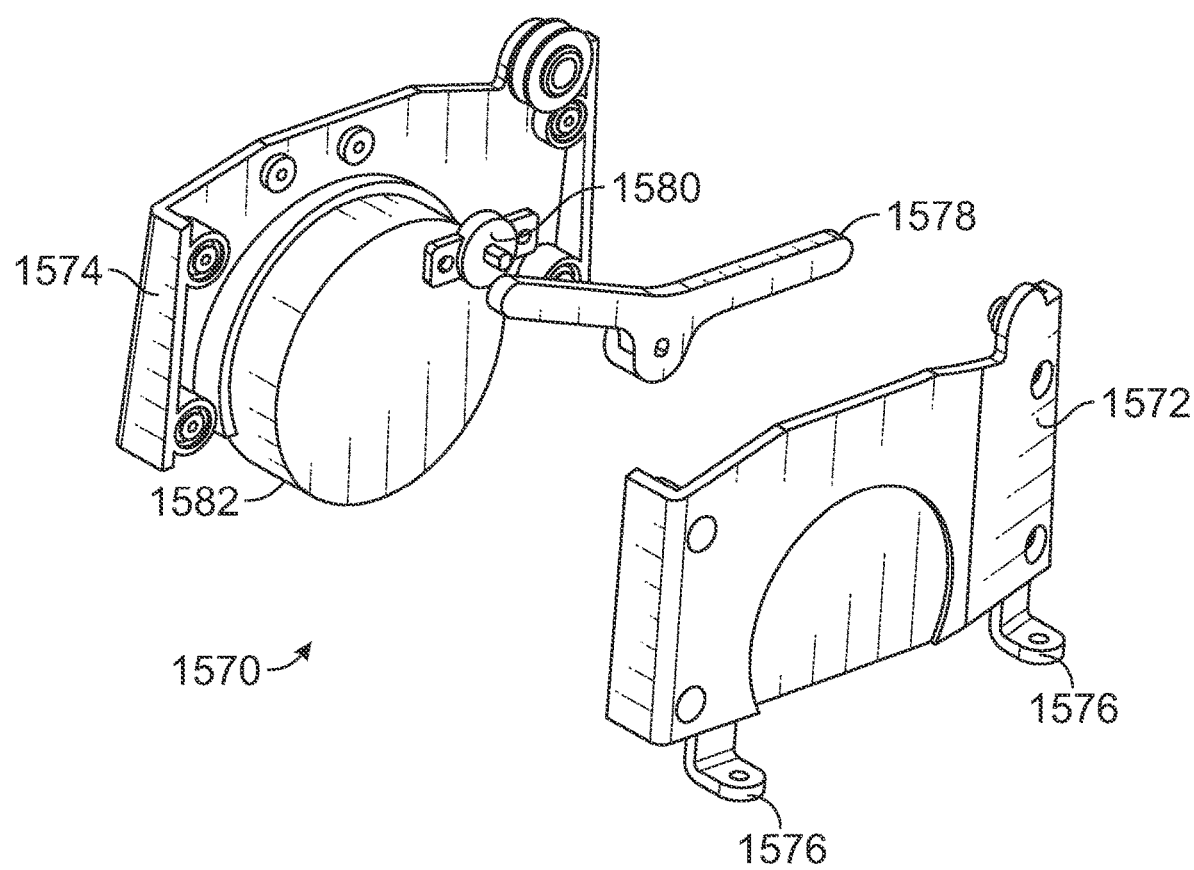

FIG. 34 is an exploded view of a damper unit.

Figure 35A:
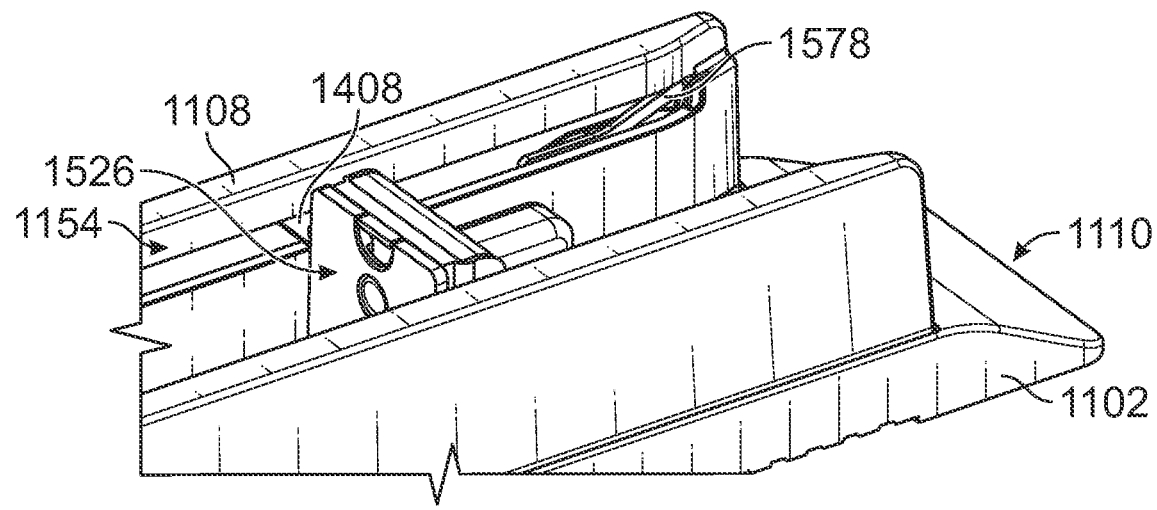
Figure 35B:
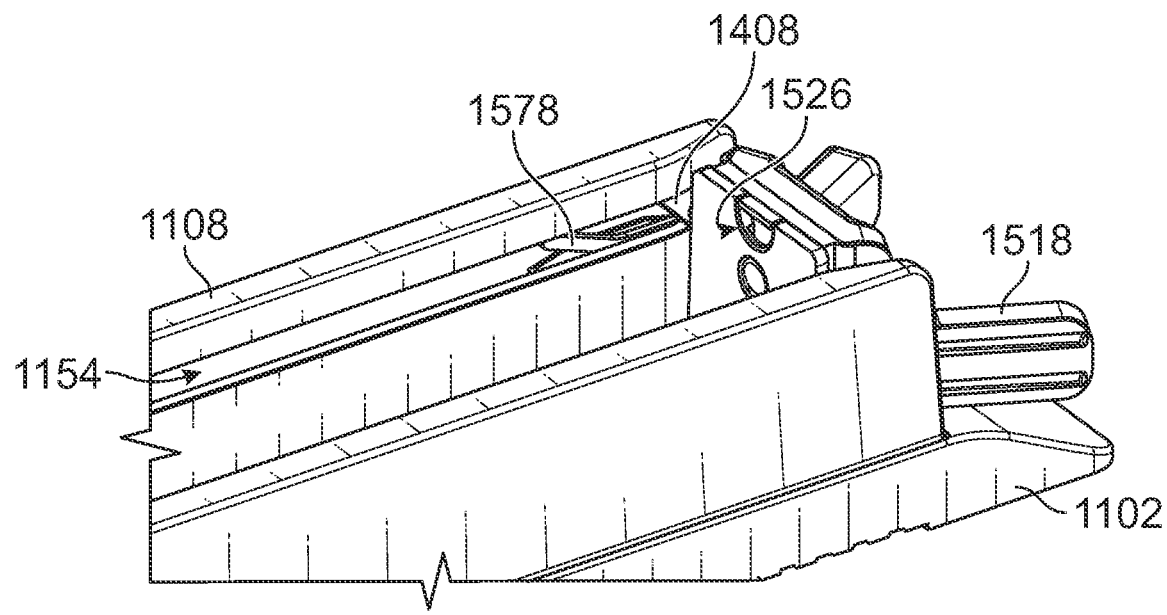

FIGS. 35a, 35b is a sequence showing the interaction of a cleaning cartridge attached to a shuttle and a damper unit.

FIG. 36 is a cartridge showing an embodiment of a clip and hook attachment of a pad to a carrier.

Figure 37:
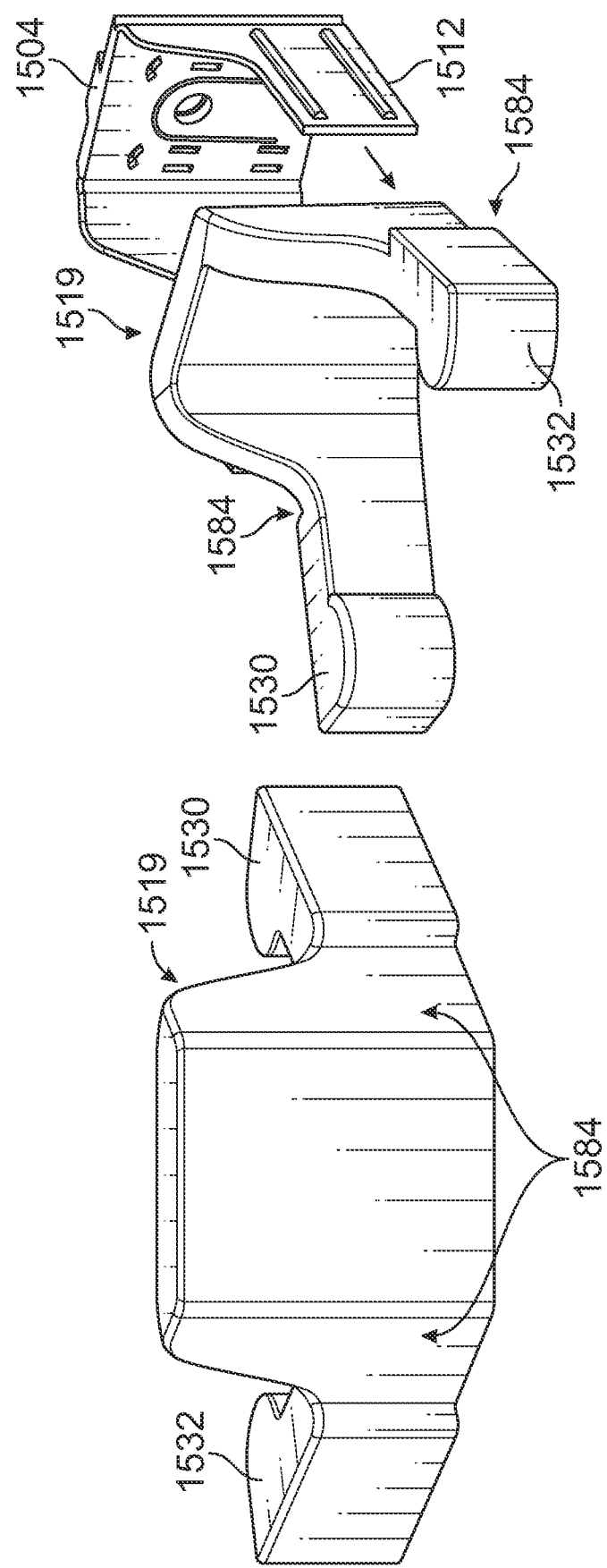

FIG. 37 is a cartridge showing an embodiment of carrier attached to a pad through pockets formed in the pad.

FIG. 38 is a cartridge showing an embodiment of a pad attached to a carrier by thermal bonding.

DETAILED DESCRIPTION OF THE INVENTION

The present disclosure is applicable to systems and methods for cleaning cart wheels, for example, when entering or exiting a clean room. More particularly, the wheel cleaner and method in accordance with the disclosure is configured to engage, clean, and release one or more wheels of a wheeled unit. For purposes of this disclosure, wheeled unit could be a cart, trolley, shelving unit, dolly, table, chair, storage cabinet, or any piece of equipment, a conveyance, mechanism, system, or any device that includes wheels configured to permit the unit to be moved on the wheels. The wheel cleaner is advantageously arranged to passively engage, clean, and release one or more wheels of a wheeled unit at one time as the unit moves through the wheel cleaner. For brevity, the disclosure will refer to a cart, without being limited thereto.

Figure 1:
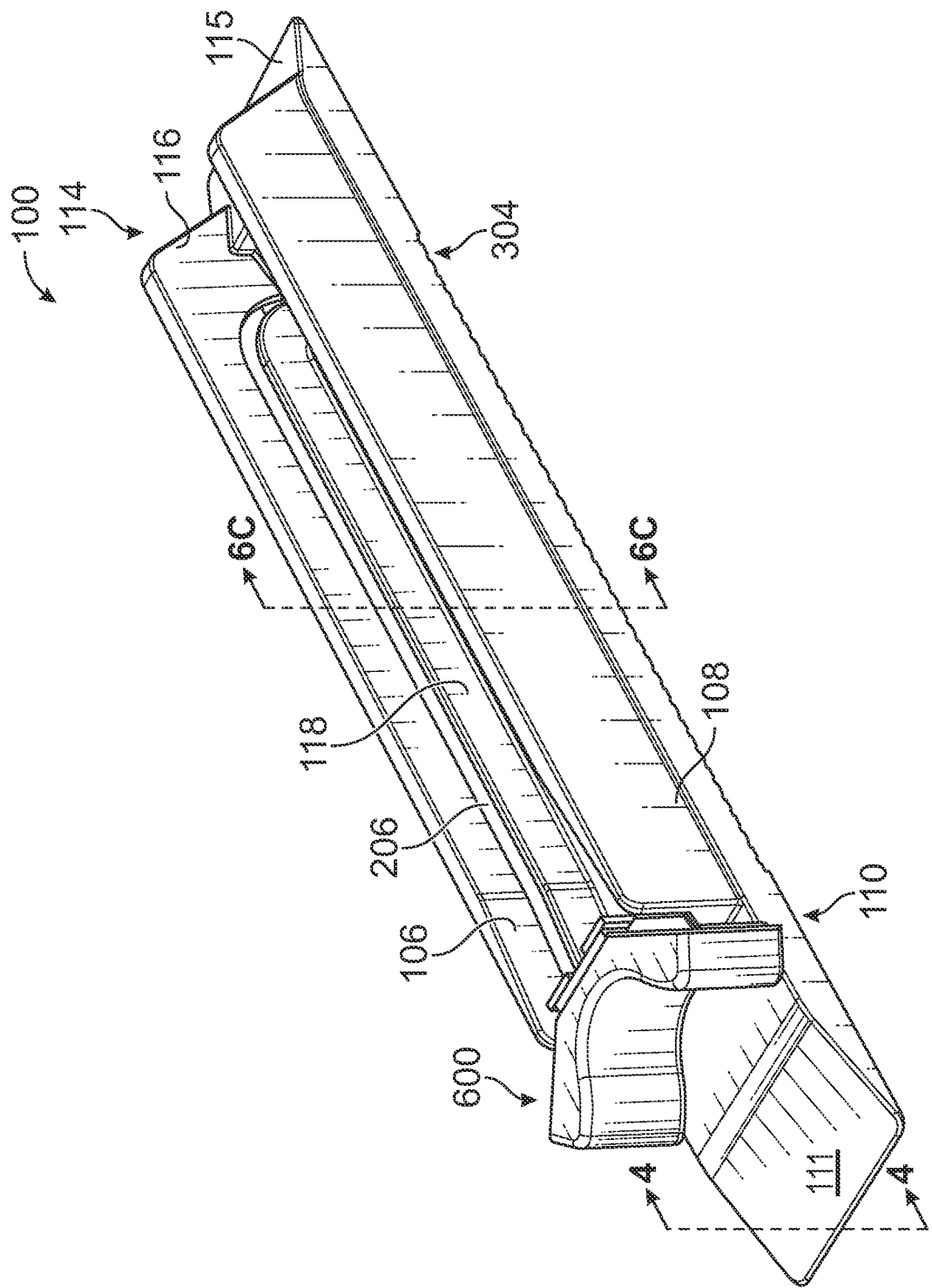
FIG. 1 is perspective view of a wheel cleaner in accordance with the disclosure.

One embodiment for a wheel cleaner 100 in accordance with the disclosure is shown in FIG. 1. The wheel cleaner 100 includes an elongated body 102, which is shown removed from the wheel cleaner 100 for illustration in FIG. 2, and in cross section in FIG. 3. In reference to FIGS. 1, 2 and 3, the elongated body 102 includes a base plate 104, from which a left wall plate 106 and a right wall plate 108 extend on either side of a central channel 118. In the embodiment shown, the left and right wall plates 106 and 108 extend parallel to one another from either lateral side of the base plate 104 such that the central channel 118 has a generally uniform width along a length of the base plate 104. The central channel 118 defines an entry end 110 at one longitudinal end of the base plate 104, and an exit end 114 opposite the entry end 110 at another longitudinal end of the base plate 104.

The elongated body 102 may be made out of a metal or metal alloy, ceramic, a composite material, plastic, synthetic or composite material, wood, resin, or polymer, such as an epoxy. The elongated body may be coated with an overlay material such as a polymer, resin, or other compound. The elongated body may be formed from a single piece of material and manufactured by, 3D printing, casting, for example by vacuum casting, injection molding, including reaction injection molding, thermo-foam casting, and milling, or it may be an assembly of the various constituent elements, each of which may be manufactured by the above manufacturing methods, or others, depending on the element. If the elongated body is manufactured or fabricated as an assembly of components connected to one another, the connection of each component to another may depend on the mechanical and physical properties of the material of which each component is made.

In particular, the left wall plate 106 extends vertically from a left side of the base plate 104 and the right wall plate 108 extends vertically from a right side of the base plate 104 in a direction of use and in the orientation shown in FIG. 3. The left wall plate 106 and the right wall plate 108 are parallel to one another and span almost an entire length of the base plate 104 along a longitudinal direction, L. The base plate 104 further includes an entry incline 111 and an exit incline 115, which are shaped and operate as inclined ramps to facilitate entry and exit of cart wheels through the body and within the channel 118, as will be described below. The base plate 104 extends the entire length of the elongated body 102. The base plate 104 may be made to be any width to accommodate any width wheel or number of wheels that are inserted and travel along the central channel 118 during use, as will be described hereinafter. The left wall plate 106 and the right wall plate 108 may extend to any height away from the base plate 104 sufficient to cover at least a wheel axle portion and accommodate wheels of varying heights.

Defined and extending between the left wall plate 106 and the right wall plate 108, and above the base plate 104, is the central channel 118, which extends the length of the left and right wall plates 106 and 108. The central channel 118 is an open channel that includes an entry end 110 at one end of the elongated body 102, the entry end 110 defined at or around an opening between the base plate 104 and the left and right-side wall plates 106 and 108. The entry end 110 includes an entry opening 112. The entry opening 112 is sufficiently wide to allow a cart wheel to enter and travel along the central channel 118 in the longitudinal direction L. Opposite the entry end 110 is an exit end 114. The exit end 114 has an exit opening 116 defined between the base plate 104 and the left and right-side wall plates 106 and 108. The exit opening 116 is sufficiently wide to allow the cart wheel to exit the central channel 118.

FIG. 4 is a cross section through the wheel cleaner 100. During operation, a cart wheel W in a typical configuration is rotatably mounted on an axle, A, which is retained in a bracket or yoke, B. Under a pushing force applied by a user, the wheel W rotates in a direction shown by arrow R as it passes through the wheel cleaner 100. As the wheel W approaches the wheel cleaner 100, it rolls up incline 111 and enters the channel 118 through the entry opening 112 by rolling up an entry incline 111. The entry incline 111 is formed forward of the entry end 110 on the base plate 104. The wheel W travels through the central channel 118 and exits the wheel cleaner 100 through the exit opening 116. To avoid bumps, the wheel W rolls along the exit incline 115 after exiting the central channel 118 through the exit opening 116. The exit incline 115 is formed behind the exit end 114 on the base plate 104 and may extend from the base plate 104 and increase or decrease in inclination, enabling the wheel to roll to a height above or below the base plate 104 depending upon the needs of the operating environment.

Returning to FIG. 3, the generally U-shaped cross section formed by the base plate 104, left wall plate 106, right wall plate 108, and central channel 118 is illustrated. It can be seen that the left wall plate 106 and the right wall plate 108 may be connected mechanically to the base plate 104, either on a left and right edge of the central channel 118, respectively, of the base plate 104 or by a mechanical connection to a top face of the base plate 104, but it should be appreciated that the base plate 104 may extend beyond the wall plates in a widthwise direction. Additionally, the base plate 104, left wall plate 106, and right wall plate 108 could all be formed from a single piece or material through a machining process, casting process, extrusion process, molding process, 3D printing process, or a combination of two or more of those processes.

Within the U-shaped cross section there exists a slot 204, left guide slot 206, and right guide slot 208. The slot 204 is formed in the base plate 104 and is disposed upon the base plate 104 between the left wall plate 106 and the right wall plate 108. The left guide slot 206 is formed wholly in the left wall plate 106 alone and is disposed at a point upon the left wall plate 106 above the base plate 104. Similarly, the right guide slot 208 is formed wholly in the right wall plate 108 alone and is disposed at a point upon the right wall plate 108 above the base plate 104. The slot 204 extends along the base plate 104 covering a distance at least as long as the left wall plate 106 and right wall plate 108. The length of the slot 204 may not necessarily extend the length of either wall plate, and the initial point of the slot 204, which is visible in FIG. 2, may be forward of the left wall plate 106 and right wall plate 108 on the elongated body 102 and may terminate on the elongated body 102 at a point beyond the left wall plate 106 and right wall plate 108. The left guide slot 206 extends along the left wall plate 106 over a distance covering the entirety of the left wall plate 106. The right guide slot 208 extends along the right wall plate 108 over a distance covering the entirety of the right wall plate 108. Each guide slot 206 and 208 in the illustrated embodiment has a straight section 107 along a majority of the central channel 118, and a downwardly curved section 109 as it approaches the exit end 114, as shown in FIG. 4.

In operation, the slot 204, left guide slot 206, and right guide slot 208 guide a shuttle 300 as it traverses the central channel 118 in a guided manner. The central channel 118 controls the path of the shuttle's motion along the elongated body 102. The left guide slot 206 and right guide slot 208 allow for a guide arm on the left side 406 and right side 408 of the shuttle 300 to give the shuttle stability in the central channel 118 while the shuttle moves along the length of the elongated body 102. An outline, exploded view of the shuttle 300 is shown in FIG. 5.

As shown in FIG. 4, a wheel W entering and travelling through the central channel 118 engages the shuttle 300 and together with the shuttle, pushing the shuttle, travels along the length of the elongated body 102. An optional mat 302, a mat interface 304, and a carriage receiving tray 306 are also visible in cross section in this view.

The shuttle 300 is slidingly engaged with the guide slots 204 and 206 through sliding engagement of the arms 406 and 408, respectively. Additionally, if a left guide slot 206 is formed in the left wall plate 106, and/or if a right guide slot 208 is formed in the right wall plate 108, as they are in the illustrated embodiment, the shuttle 300 may be slidingly engaged with either or both guide slots as well as with the slot 204. A carriage receiving tray 306, which is visible in FIG. 4 and is embodied as a depression formed in the base plate 104 adjacent the exit end 114 of the elongated body 102, receives the shuttle 300 as it swings down due to the curved sections 109 of the slots. The carriage receiving tray 306 can be located or disposed behind the end of the slot 204 but forward of the exit incline 115 and is connected to the curved section 109 of the slot 204. Additionally, the carriage receiving tray 306 may be formed in the base plate 104 before the end of the left wall plate 106 and right wall plate 108 or may be formed in the base plate 104 partially beyond the wall plates or even entirely beyond the end of the wall plates. The purpose of the receiving tray 306 is to accommodate the shuttle and remove it from presenting an obstacle as the wheel W passes over the shuttle and exits the central channel 118. The carriage receiving tray 306 is therefore sufficiently large to accommodate whatever geometry or size of different shuttles 300 may be used, when the shuttle 300 is in a lay-flat position as it rests within the receiving tray 306.

In certain applications, more than one wheel cleaner 100, for example, two wheel cleaners 100, can be used in tandem to simultaneously treat both wheels of a cart that are aligned at one end of the cart. For adjustability and adaptability to different sizes of carts, cart widths, cart axle lengths, and so forth, the two or more wheel cleaners can be secured to a mat at a predetermined width and in an arrangement to accommodate more than one cart wheel. Alternatively, or in addition, more than one wheel cleaner can be arranged in line with one another to perform multiple cleanings of the same wheel as it rolls in a straight path. To secure, at least temporarily, the one or more wheel cleaners in a desired configuration, a mat may be used that sits on a rolling surface of the wheels and connects the wheel cleaners to one another. As shown in FIG. 4, the mat 302 connects to the wheel cleaner 100 by a mat interface 304 formed on the bottom face of the elongated body 102, specifically on the bottom face of the base plate 104. The elongated body 102 is releasably connectable atop the mat 302 along the mat interface 304. The elongated body 102 may be disposed in any orientation across the surface of the mat 302. In one embodiment, the mat interface 304 may include teeth connecting or meshing with complimentary teeth or ridges on the surface of the mat 302, and other arrangements can also be used.

In an alternative embodiment, the mat and mat interface may be a hook and loop connection. Alternatively, the mat and mat interface may connect through a button mechanism, or a snap mechanism. In another alternative embodiment the mat and mat interface may connect through a magnetic connection where a magnet is included on the mat and the mat interface is itself a magnet or magnetic (i.e., the elongated body may be made out of a magnetic material or include an embedded ferromagnetic element). In another alternative embodiment there may be no mat nor mat interface and instead the wheel cleaning apparatus may be mechanically fastened to the floor or another surface through a fastener. In another alternative embodiment the wheel cleaning apparatus may be connected to the floor or another surface through an adhesive, and the like.

In reference to the cross-section of FIG. 4, during operation, the shuttle 300 travels the length of the elongated body 102 by sliding along the slot 204. The shuttle 300 slides by the force exerted upon the shuttle 300 by the wheel W, which the shuttle 300 engages, where the force exerted is supplied by an operator pushing the cart attached to the wheel through the central channel 118 along the length of the elongated body 102. The shuttle 300 receives the wheel at the entry end 110 of the elongated body 102 through the entry opening 112. Upon receiving the wheel, the shuttle 300 slides along the slot 204, with the wheel being engaged by the shuttle 300, and travels from the entry end 110 to the exit end 114. At the exit end 114, the shuttle 300 disengages the wheel and the wheel is released and passes through the exit opening 116 of the elongated body 102. The length of the elongated body 102 and, more specifically, the travel length along which the wheel W travels within the channel 118 while engaged with the shuttle 300, is sufficient to permit the wheel W to complete at least one full revolution. In other words, the engaged travel length of the wheel and shuttle is at least equal to two times the radius of the wheel, times pi, i.e., the circumference of the wheel.

An exploded view of the shuttle 300 is shown in FIG. 5, an outline view of a carriage 402 of the shuttle 300 is shown in FIG. 6, and an exploded view of the carriage 402 and cleaning pad or cartridge 518 is shown in FIG. 7. In reference to these figures, it can be seen that the carriage 402 includes a mounting plate 404, a left side guide arm 406, a right-side guide arm 408, a pivot joint 410, a cartridge 518, a sled 414, a cartridge connection interface 416, and a cartridge removal interface 418. The mounting plate 404 forms the left and right guide arms 406 and 408 and forms the support and guiding structure of the shuttle 300 relative to the elongated body 102. The sled 414 is connected to the mounting plate 404 through a pivot joint 410 and slidably travels within a bottom slot of the body. A cleaning element or cartridge 518 is mechanically coupled to the mounting plate 404 on the carriage 402. The left side guide arm 406 is formed on the left side of the mounting plate 404 and the right-side guide arm 408 formed on the right side of the mounting plate 404. Each guide arm protrudes from its respective side of the mounting plate 404, horizontally and linearly in an aligned fashion to define a pivot axis for pivoting the mounting plate 404 relative to the elongated body 102 and permit rotation of the shuttle 300 as it traverses the curved sections 109 of the slots, as previously described. The left side guide arm 406 slidingly engages the left guide slot 206 and the right-side guide arm 408 slidingly engages the right guide slot 208. The guide arms have a round cross section to permit pivotal engagement with the slots, to accommodate wheels of different radii, but rectangular or square cross sections can also be used if using a wheel with a known diameter. The cartridge connection interface 416 is formed on the front face of the mounting plate 404 as a result of the mounting plate's 404 manufacturing process and is a protrusion in a shape complimentary to a receiver on the cartridge 412. The cartridge removal interface 418 is a half-circle or other notch formed along the top edge of the mounting plate 404.

In operation, the cartridge 518 may be attached to the mounting plate 404 by a sliding engagement coupling or by another mechanical coupling feature. The mounting plate 404, pivotally connected to the sled 414, pivots from a first position to a second position when the mounting plate 404 reaches the exit end 114 of the elongated body 102. The first position is an up-right position where the mounting plate 404 extends perpendicularly from the top face of the base plate 104, and the cartridge 518 faces the entry end 110 of the elongated body 102. In the second position, the mounting plate 404 and cartridge 412 pivot to a supine position where the mounting plate 404 lays down and into the receiving tray 306 in base plate 104. In the second position the cartridge 518 pivots from facing the entry end 110 of the elongated body 102 to face vertically upward and out of the central channel 118.

The sled 414 slidingly travels along the slot 204 and, together with the arms 406 and 408, provides three points of sliding contact to guide the shuttle 300 through the central channel 118. The left side guide arm 406 and the right-side guide arm 408, which slidingly travel along the left guide slot 206 and right guide slot 208 respectively, aid the travel of the cartridge 518 by keeping the cartridge upright in the proper position for cleaning while the shuttle 300 travels through the central channel 118. When the shuttle 300, and therefore the cartridge 518, reach a certain point on the elongated body 102, the left guide slot 206 and the right guide slot 208 may change direction from their initial horizontal orientation along the left wall plate 106 and right wall plate 108, respectively, and arc or angle downward toward the top face of the base plate 104. By changing direction, the left guide slot 206 and right guide slot 208 cause the left side guide arm 406 and right-side guide arm 408 to pivot the carriage 402 downward as they travel through the curved sections 109 (FIG. 4).

The carriage 402 and the sled 414 may each be made out of a metal or metal alloy, a composite material, ceramic, plastic, synthetic material, wood, resin, or polymer, such as an epoxy, and the like. Material selection depends on a particular application, and advantageously provides rigidity to the structures involved without being susceptible to corrosion, wear, and mechanical deformation during use. The carriage 402 and the sled 414 need not be made out of the same material. The carriage 402 and sled 414 may be manufactured through 3D printing, a casting process such as vacuum casting, injection molding including reaction injection molding, thermo foam casting, thermoforming, or a milling process. The carriage 402 and sled 414 do not need to be manufactured using the same manufacturing method. The cartridge connection interface 416 and the cartridge removal interface 418 are discussed further below.

In an alternative embodiment, the cartridge and carriage comprise a single, integrated, non-detachable component. The carriage (including the non-separable cartridge) may itself be detachable from the sled. In this configuration the sled is a non-detachable element of the wheel cleaning apparatus. Alternatively, the carriage (with non-separable cartridge) includes a cleaning pad. In this configuration the cleaning pad connects to the cartridge and is detachable from the cartridge thereby enabling the cleaning pad to be exchanged for a new component or to be refurbished and reinstalled. The entirety of the shuttle, apart from the cleaning pad, is a non-detachable feature of the wheel cleaning apparatus.

In another alternative embodiment, the left wall plate and the right wall plate are not of a height sufficient to include a guide slot and may be omitted, in which case the pivotal connection 410 and sled are of sufficient strength to support and guide the shuttle 300 entirely along the elongated body 102.

FIGS. 6 and 7 illustrate the cartridge 518. Cartridge 518 includes cartridge base plate 504, which includes a mounting plate attachment 506, cartridge removal tab 508, left-side hinged flap 510, right-side hinged flap 512, left guide slot rib 514, left contact rib 515, right guide slot rib 516, right contact rib 517, cleaning pad 519, and cleaning pad receiver 520.

The cartridge base plate 504 is a plate comprising a middle section and a left section connected to the middle section by the left-side hinged flap 510 to form a living hinge, and a right section connected to the middle section by a right-side hinged flap 512 to form another living hinge. The hinges permit pivoting motion and may also include a resilient force element provided by the material of the base plate or a spring and the like that imparts a biasing force in an opening direction tending to push the flaps 510 and 512 apart or in a receiving position where they are spread apart to permit a wheel to enter between them. The cartridge base plate 504 may be created by a casting, injection molding, blow molding, thermoforming, rotational molding, machining, or any other manufacturing process. On the rear face of the middle section of the cartridge base plate 504, the mounting plate attachment 506 is formed to releasably connect the base plate 504 to the mounting plate 404 of the shuttle 300 (FIG. 5). Similarly, the cartridge removal tab 508 is formed on the rear face of the middle section of the cartridge base plate 504 as a result of the manufacturing process. The cartridge removal tab 508 may be formed on the mounting plate attachment 506 or the cartridge base plate 504, depending upon the geometry of the mounting plate attachment 506.

The left guide slot rib 514 is formed on the rear face of the left section of the cartridge base plate 504 at a position on the cartridge base plate 504 level with the left guide slot 206. The left contact rib 515 is formed on the rear face of the left section of the cartridge base plate 504, and below the left guide slot rib 514, as a result of the manufacturing process. The right guide slot rib 516 is formed on the rear face of the right section of the cartridge base plate 504 at a position on the cartridge base plate 504 level with the right guide slot 208. The right contact rib 517 is formed on the rear face of the right section of the cartridge base plate 504, and below the right guide slot rib 516, as a result of the manufacturing process. The left guide slot rib 514 slidingly engages the left guide slot 206, and the right guide slot rib 516 slidingly engages the right guide slot 208 to help maintain alignment and orientation of the shuttle 300 relative to the elongated body 102 during motion of the wheel and shuttle 300 along the central channel 118. Advantageously, the left and right guide slot ribs 514 and 516 provide stability to the cartridge 518 in operation.

The cleaning pad 519 is mechanically connected, attached or otherwise associated with a cleaning pad receiver 520. The cleaning pad receiver 520 is a surface on the front face of the cartridge base plate 504. The cleaning pad receiver 520, or the cleaning pad 519, or both the cleaning pad receiver 520 and the cleaning pad 519, may be coated in an adhesive paste, liquid, gel, or other adhesive compound. This may allow the cleaning pad receiver 520 to have a smooth or textured surface. In an alternative embodiment the cleaning pad and base plate, the cartridge, are all one piece or permanently connected and in order to exchange the cleaning pad, the entire cartridge needs to be disconnected from the carriage and cleaned or exchanged.

The cartridge base plate 504 may be a metal or metal alloy, a composite material, rubber, plastic, synthetic material, resin, or polymer, such as an epoxy. The cartridge base plate 504 may be manufactured through 3D printing, vacuum casting, injection molding including reaction injection molding, thermo-foam casting, thermoforming, casting, and machining or milling.

The materials comprising the cleaning pad 519 may include natural or synthetic sponge material, natural or synthetic rubber, nonwoven material, polyester fabric, a laminated construction, cloth or other textile, foam, including melamine foam, aluminum oxide, or other metallic, pads, and abrasive pads. Each cleaning pad 519 material may be stearated or non-stearated. In the instance where the cleaning pad 519 material is a stearated material, the cleaning pad 519 may or may not require an application of an additional cleaning solution. The material making up the material of the pad 519 should be flexible so at to conform to different wheel sizes and shapes and irregularities in the wheel, should be capable of absorbing and releasing cleaning fluid and other compounds or materials.

It will be understood that the pad 519 may be constructed of one layer of material, one type of material, multiple layers of materials, and/or multiple types of materials. The pad 519 may be reusable and in this case launderable and may be sterilizable depending on application, may be disposable and environmentally safe or biodegradable into environmentally non-toxic constituents.

The cleaning solution coating, absorbed by, or impregnated in the cleaning pad may be an antiseptic and/or cleaning or detergent-containing solution for example, a solution that may be used in a hospital, health services facility, laboratory environment, food processing or testing facility, and/or an animal processing facility.

In operation, the cleaning pad 519 is connected to the cleaning pad receiver 520 on the cartridge 518. The cartridge 518 is mechanically connected to the carriage 402, wherein the mounting plate attachment 506 is mechanically coupled to the mounting plate 404. More particularly, the mounting plate attachment 506 slidingly engages the cartridge connection interface 416. The cartridge connection interface 416 is shaped to fit inside the mounting plate attachment 506, depending on the shape of the mounting plate attachment 506. The mounting plate attachment 506 may include a channel that slidingly engages with the cartridge connection interface 416. The mounting plate attachment 506 may comprise the entire back face of the cartridge base plate 504 or may cover only a portion of the back face of the cartridge base plate 504. Depending on the geometry of the mounting plate attachment 506, the mounting plate attachment 506 may extend beyond the edges of the cartridge base plate 504. This may advantageously allow a particular mounting plate attachment to connect to different mounting plates of different sizes or shape, for example, if a cartridge for a smaller wheel is installed on a larger carriage normally used for a larger wheel. Alternatively, the mounting plate attachment may be a snap-on or press-fit enclosure which receives the cartridge connection interface. Other attachment mechanisms are disclosed hereinbelow.

In order to disconnect the cartridge 518 from the carriage 402 an operator pulls the cartridge removal tab 508, separating the two components. To manipulate the cartridge removal tab 508, the operator inserts a finger or key into the space between the cartridge removal interface 418 and the cartridge removal tab 508. The space between the cartridge removal interface 418 and the cartridge removal tab 508 is a result of the cartridge connection interface 416 to mounting plate attachment 506 connection. When the cartridge connection interface 416 engages the mounting plate attachment 506, the face of the mounting plate attachment 506, and the rear face of the mounting plate 404 are flush, or, if not flush, at least planarly aligned in parallel at a set distance determined by the dimensions of the cartridge connection interface 416 and the mounting plate attachment 506. Regardless of whether the cartridge removal tab 508 extends from the cartridge base plate 504 or the mounting plate attachment 506, the cartridge removal tab 508 extends to be flush with the front face of the mounting plate 404 or may even extend beyond the mounting plate 404. The greater the extension over the mounting plate 404, the more surface area an operator has to manipulate the cartridge removal tab 508. The space the operator manipulates the cartridge removal tab 508 through is the size and shape of the cartridge removal interface 418 itself.

In an alternative embodiment, the cleaning pad receiver may include a clip, a hook-and-loop attachment, a mechanically snap-fitting fixture, a press-fit fixture, or any other mechanical attachment fixture. In the instance where the cleaning pad receiver includes a particular mechanical attachment fixture, the cleaning pad includes a complimentary mechanical attachment fixture. Additionally, in another alternative embodiment, the cleaning pad receiver may include a magnet. In the instance that the cleaning pad receiver includes a magnet, the cleaning pad includes a properly polarized magnet. In an additional alternative embodiment, the cleaning pad is connected to the cleaning pad receiver by an adhesive or thermal bond.

In an alternative embodiment the cleaning pad may be shaped to accommodate any wheel and wheel tread geometries not considered standard geometries.

In another alternative embodiment, the cleaning solution may be a degreaser to remove oil, grease, coolant, or other compounds from a wheel and to clean the wheel, generally, at the same time. Additionally, in another alternative embodiment, the cleaning solution may include a grit or agitator to remove debris or other matter from the wheel while cleaning or to provide some other benefit, for example, polishing, buffing, etching, grinding, or reforming the wheel to enable an additional form of cleaning or to mitigate any damage or physical nonconformities the wheel's operating environment may have affected upon the wheel. In another alternative embodiment the cleaning solution may be a nontraditional/nonconventional solution or even a counterintuitive solution such as a caustic acid or corrosive base which may itself damage the wheel but provide a desired benefit upon application to the wheel.

FIG. 1, along with FIGS. 8 and 9 illustrate the shuttle 300 in various stages of the shuttle 300 in operation. Specifically, in FIG. 1 the shuttle 300 in an initial operation position 600, which corresponds to a ready or first position in which the wheel cleaner is ready to receive a wheel for cleaning. In the initial operation position 600, the carriage 402 with the cartridge 412 installed upon it are in an open position enabling the shuttle 300 to receive a wheel. Further, the cartridge 518 may be disposed free of the entry opening 112 and outside of the elongated body 102 to permit the flaps 510 and 512 to resiliently assume a spread apart position, ready to receive the wheel between them.

FIG. 8 is a cross section view showing the wheel engaged with the shuttle 300 in an intermediate or second position 602 while the wheel and shuttle travel along the central channel 118 and a cleaning operation of the wheel is actively occurring. When a wheel enters the wheel cleaner 100, a leading edge of the wheel tread contacts the cleaning pad 519 and pushes it, thus pushing the central panel of the cleaning pad receiver 520 (see FIG. 7). This push urges the shuttle 300 to enter into the central channel 118 whereby the walls push the flaps 510 and 512 to close against their biased opening position and hug or surround on three sides the rolling wheel, as shown in FIG. 8. In this position, the cleaning pad 519 is pressed against the treat and side portions of the wheel to permit friction between the cleaning pad 519 and the wheel, which friction, in the presence of a cleaning solution on the cleaning pad, effects the cleaning of the outer surfaces of the wheel. As the wheel rotates at least one full revolution an entire outer surface of the wheel may be passed into contact with the cleaning pad 519 and be cleaned thereby. Multiple revolutions of the wheel results in multiple passes with contact with the pad and a better cleaning. The cleaning operation position 602 includes the cartridge 412 engaging the outer surfaces of the wheel.

In operation, the shuttle 300, and thereby the left section and right section of the cartridge base plate 504 have now, if not already inside the central channel 118, entered the central channel 118. The shuttle 300 enters the central channel 118 through the entry opening 112 and moves through the central channel 118 along the base plate 104 of the elongated body 102 by an operator exerting force on the wheel, which in turn exerts force on the middle section of the cartridge base plate 504. The middle section acts as a backstop for the wheel. Additionally, due to the force exerted by the operator, the left guide slot rib 514 and left contact rib 515 cause the left section of the cartridge base plate 504 to be in compressive contact between the left guide slot 206 and left wall plate 106, and the left face of the wheel. Similarly, the right guide slot rib 516 and right contact rib 517 cause the right section of the cartridge base plate 504 to be in compressive contact between the right guide slot 208 and right wall plate 108, and the right face of the wheel.

The operator continuously exerts force on the cart, which pushes and causes the wheel to engage by the shuttle 300 and to travel along the length of the elongated body 102 and rotate in place relative to the cleaning pad 519 and the wheel rolls along the elongated body 102 within the central channel 118, all the while being encumbered by the shuttle 300 and cleaned by the cleaning solution on the cleaning pad 519. The shuttle 300 persists in cleaning operation position 602 until the shuttle 300 reaches the exit end 114 of the elongated body 102. At the exit end 114 the shuttle 300 pivots due to the change in path of the left guide slot 206 and the right guide slot 208. The shuttle 300 pivots to a position into the tray and out of the way of the wheel, which steps over the retracted shuttle and exits the wheel cleaner 100.

FIG. 9 illustrates the shuttle 300 in a release and return operation position 604. The release and return operation position 604 includes the carriage 402, the mounting plate 404 and cartridge 518, pivoting into the carriage receiving tray 306 causing the carriage 402 to lay in a horizontal position in parallel with the top face of the base plate 104 when the shuttle 300 reaches the exit end 114 of the elongated body 102. The carriage 402 either lays planarly flush with the opening of the slot 204 or lays at a depth below the slot 204 opening thereby enabling the carriage 402 to travel through the slot, beneath the slot 204 opening on the top face of the base plate 104.

Additionally, in this position, the left section and right section of the cartridge base plate 504 extend vertically away from the base plate 104 in an upright and perpendicular orientation to the base plate 104. The left section may still be in compressive contact between the left wall plate 106 and the left face of the wheel, and the right section may still be in compressive contact between the right wall plate 108 and the right face of the wheel, but because the middle section of the cartridge base plate 504 is now laying in the carriage receiving tray 306, the operator may exert force upon the wheel and push it free from the compressive engagement. Thus, the wheel is released from the shuttle 300 and leaves the wheel cleaner 100 through the exit opening 116. Because the carriage 402 is laying horizontally in the carriage receiving tray 306 it is in the proper position to be automatically returned to the entry end 110 of the elongated body 102 thereby returning to the initial operation position 600.

FIG. 10 illustrates a shuttle retraction mechanism 700. The shuttle retraction mechanism 700 includes a spring housing port 702, spring housing 704, string 706, string connector 708, a bumper 710, and a string connector port 712. The bumper 710 may be made out of natural or synthetic rubber, foam, cork, or other impact-dampening material. The shuttle retraction mechanism 700 operates to retract the shuttle 300 following a dismount of a wheel that has been cleaned from the exit end back towards the entry end of the elongated body 102 to reset the position of the wheel cleaner 100 back to the ready position so another wheel can enter and be cleaned.

The spring housing port 702 is formed in the elongated body 102 on the bottom face of the base plate 104. The spring housing port 702 is located in the elongated body 102 forward of the entry opening 112 in order for the shuttle 300 to be returned to its initial operation position 600 where, for example, the cartridge 518 may be positioned free of the left wall plate 106 and the right wall plate 108. Because the cartridge 518 extends beyond the left wall plate 106 and right wall plate 108 the left and right sections of that cartridge 518 are again open and ready to receive and engage a wheel. The shape of the spring housing port 702 contours the shape of the spring housing 704 enabling the spring housing 704 to be press-fit or snap-fit into place. Advantageously this adhesive or fastener free mode of connection enables the shuttle retraction mechanism 700 to easily be removed and exchanged. Alternatively, the shape of the spring housing port is a polygonal opening that a spring housing of any shape may be fasted to the elongated body through an adhesive or other mechanical fasteners. In another alternative embodiment, the spring housing may be retained in the spring housing port through a hook and loop connection or through a magnetic connection.

The spring housing 704, which is embodied similar to a lanyard retracting device, includes a rotary spring (not visible) stored inside the spring housing 704. A string 706 is rolled on a spool, which spool is connected to the housing 704 via the spring such that extraction of the string causes a rotation of the spool, which in turn stores energy into the spring. When extraction is complete, and the shuttle is free of the wheel, the stored energy in the spring operates to rotate the spool in the opposite of the extraction direction, thus retracting the string back into the housing as the spool rotates to wind the string back up. The first end of the string 706 is attached to the spool within the spring housing 704 and a second end of the string 706 is attached to a string connector 708. A string connector port 712 is formed in the sled 414 of the carriage 402. The string connector 708 mechanically couples with the string connector port 712. The bumper 710 is mechanically connected to the bottom face of the base plate 104 or connects to the bottom face of the base plate 104 through an adhesive at a position forward of the spring housing 704 between the spring housing 704 and the sled 414. In an alternative embodiment, the bumper may include a plurality of bumpers.

In operation, when the shuttle 300 is pushed from the initial operation position 600 and into the cleaning operation position 602, the string 706 begins to uncoil and extend from a retracted position inside the spring housing 704 to an extended position. As the shuttle 300 travels the length of the elongated body 102, the string 706 continues to extend thereby turning the spool in an unrolling direction and loading the internal spring. When the shuttle 300 reaches the exit end 114 of the elongated body 102 and pivots to the release and return operation position 604 the load of the spring causes the spool to turn in a retracting direction and the string 706 to retract into the spring housing 704 thereby pulling the shuttle 300 (i.e., the string connector 708 pulling the sled 414 at the string connector port 712), back to the entry end 110 of the elongated body 102. The sled 414 contacts the bumper 710, which stops the sled 414 from moving and dampens the impact of the sled 414 and any bouncing-back of the sled 414 when coming to a stop. When the string 706 has returned to its original, retracted position inside the spring housing 704, the shuttle 300 has been returned to the entry end 110 of the elongated body 102 and is in initial operation position 600, ready to receive a wheel.

In an alternative embodiment, the spring housing may include a gasket or O-ring around its sides to prevent any substances from the operating environment from interfering with the connection between the spring housing and the spring housing port and elongated body. In order to accommodate the O-ring or gasket the spring housing port includes an O-ring/gasket groove to utilize the O-ring/gasket squeeze to create a seal when the spring housing is mated to the spring housing port. This alternative embodiment is advantageously beneficial, for example, when the cleaning solution that is used or the operation environment is corrosive.

FIG. 11 illustrates a flow chart for a method of cleaning a wheel using a wheel cleaning apparatus. First, at step 810, a wheel is rolled into a shuttle by an operator. Next, at step 820 the shuttle engages the wheel through compression. The left section of the carriage comes into contact with a left wheel face, the middle section of the carriage contacts with the wheel's tread, and the right section of the carriage comes into contact with a right wheel face. The left and right sections of the carriage impart a compressive force from contact with the left wall plate and right wall plate onto the left wheel face and right wheel face, respectively. This compressive force is imparted on each wheel face when the wheel, engaged by the shuttle, enters and travels along a central channel. Additionally, the middle section of the cartridge acts as a backstop for the tread of the wheel thereby enabling the wheel to apply a forward force on the shuttle to move each component through the central channel.

Next, at step 830 the shuttle, once in the central channel, is pushed through the central channel along the length of an elongated body. The wheel rotates in place relative to a cleaning pad connected to the shuttle which creates a relative friction between the cleaning pad and the rolling wheel to clean the wheel as it rotates. Next, at step 840 the shuttle reaches the end of the central channel, the exit end of the elongated body, and the shuttle pivots in place thereby causing the middle section of the carriage to disengage the wheel tread. Next, at step 850, the shuttle releases the wheel when the wheel is pushed out of compression from between the left section of the carriage and the right section of the carriage, and out of the wheel cleaning apparatus through the exit opening of the elongated body.

Then, at step 860, the shuttle is pulled from the exit end of the elongated body to the entry end of the elongated body and is stopped by a bumper, or, in an alternative embodiment by a plurality of bumpers. Finally, at a step 870 the shuttle anti-pivots to its initial position after stopping at the entry end of the elongated body.

The following alternative embodiments generally reflect alternatives which may be considered "invention-wide" in that they are different embodiments compared to the embodiments described above and may incorporate some or all of the elements and alternative embodiments described above.

An alternative cleaning configuration for a wheel cleaner 900 is shown in FIG. 12. In this embodiment, the wheel cleaning apparatus 900 includes an elongated body 902 having a slot 904 disposed in the center of and horizontally along the full length of the elongated body. The slot is disposed across a direction of travel of the wheel W, rather than along it as in the wheel cleaner 100 and contains a roller or plurality of rollers 906 disposed along lateral edges of the slot. The rollers engage and roll to turn the wheels in place while the wheels contact cleaning pads 519. The roller or plurality of rollers 906 are connected to a roller rotation driver 908 connected to the elongated body at a first or second end of the elongated body. The roller rotation driver may be manipulated by an operator to control the rotation of the rollers. In the illustrated embodiment, the user may depress a pedal 910, which is connected to the rollers by a gear train (not shown) such that depression of the pedal imparts a rolling motion to the rollers 906. By controlling the rotation of the rollers the operator may spin the wheels of a cart which are engaged by the plurality of cleaning pads. Each cleaning pad engages a wheel when the wheel is placed upon the cleaning pad. The cleaning pad may engage the wheel due to an operator-controlled input element, which is a component of the roller rotation driver or is another control mechanism such as a cleaning pad engagement-lock lever. The cleaning pad engagement-lock lever and the roller rotation driver may be mechanically driven components where an operator physically manipulates the components, or each component may be driven by an electronic controller, or a combination of a mechanical driver and/or electronic controller. The cleaning pads may be connected to a cleaning pad support frame, instead of being connected directly to the elongated member, and therefore may be removable from the cleaning pad support frame in order to exchange or replace the cleaning pad. A spacing or position of the cleaning pads may be adjustable to engage one or more wheels of a particular size of cart.

FIGS. 13, 14 and 15 illustrate another alternative embodiment for a wheel cleaner. In this alternative embodiment the wheel cleaning apparatus 1000 may include a hand-held elongated member 1002 having a base 1004 and a cleaning head 1006 disposed at an end of a pole 1008 held by the user. The cleaning head 1006 includes cleaning pads 1010 disposed along a middle finger 1012 and two moveable, side fingers 1014. A manual actuator 1015 disposed on a handle 1016 can be activated by a user to pinch the two side fingers 1014 to together around a portion of a wheel to be cleaned.

During use, the user may place the head around the wheel and press the trigger or actuator 1015 to pinch the cleaning head 1006 around the wheel. The cleaning pads contain a cleaning solution such that motion of the cart by user with the cleaning head engaged operates to rub the cleaning pads against the wheel to clean the wheel. As can be appreciated, the cleaning pad on the middle finger 1012 cleans the tread portion of the wheel while the cleaning pads on the side fingers 1014 clean the sides of the wheel as the wheel rolls along the floor with the cleaning head 1006 engaged. When the wheel has completed at least one full rotation, the user may release the actuator 1015 thus releasing the wheel. The user may then engage another wheel of the cart and repeat the cleaning process. To facilitate engagement of the cleaning pads with the wheel, the cleaning head 1006 may include a clip 1018 and the pole 1008 can be omitted if the side fingers are spring-loaded in a pinching direction, as shown in FIG. 15.

Turning to FIGS. 16-28, it will be understood that the wheel cleaners and associated components described and illustrated herein in connection with FIGS. 16-28 are similar in many aspects to the wheel cleaners of FIGS. 1-15, and therefore only the differences will be discussed in detail hereinbelow.

FIGS. 16a, 16b, and 17-19 illustrate an embodiment of a cartridge 1518. Cartridge 1518 includes cartridge base plate 1504, which includes a mounting plate attachment 1506, cartridge removal tab 1508, left-side hinged flap 1510, right-side hinged flap 1512, left guide slot rib 1514, left contact rib 1515, right guide slot rib 1516, right contact rib 1517, cleaning pad 1519, and cleaning pad receiver 1520.

As in the above embodiments, the hinge functionality of the left-side hinged flap 1510 and the right-side hinged flap 1512 may be supplied by thinning the material of the base plate at the junction of the flaps 1510 and 1512 with the central panel comprising the attachment portion 1506 so as to provide more flexible portions of the base plate 1504 that act as hinges. It will be understood that other configurations of the base plate 1504 may provide hinge functionality, such as a piano-type hinge with a pin or any suitable hinge type. A pinned hinge may prove to be more durable in the current application.

The pad 1519 shown in FIG. 16b has a configuration that differs from the above examples in that the pad includes two layers of material. The pad includes a body portion 1522 and an outer portion 1524. The outer portion 1524 is attached to the body 1522 by sewing, heat bonding, hook and loop attachment, an adhesive, or any suitable attachment method. The pad 1519, in this embodiment, has a central portion 1537 and a pair of terminal ends 1535 extending laterally from the central portion. The central portion 1537 has a greater height than that of each of the terminal ends 1535 referring to the orientation of the pad 1519 in the figure.

The body portion 1522 may be made of a natural or synthetic sponge, natural or synthetic rubber, foam, including melamine foam, for example. The outer layer 1524 may be one or more of a textile of natural and/or synthetic material, a microfiber material or combinations of microfiber materials, a microfiber overstitched onto a textile or microfiber base, laminated textiles or cloth materials, for example, or any suitable material or layer that enables the pad to clean. The pad 1519 may be provided with a cleaning solution, absorbed by, or impregnated in the cleaning pad 1519 which may be an antiseptic and/or cleaning or detergent-containing solution, for example, a solution that may be used in a hospital, health services facility, laboratory environment, food processing or testing facility, and/or an animal processing facility.

Together, the body 1522 and outer layer 1524 are formed into left and right arms 1530, 1532, respectively attached to left-side hinged flap 1510, and right-side hinged flap 1512.

The shape of each of the arms 1530, 1532 may be essentially rectangular terminating with a generally semi-circular protrusion 1534, 1536, with each protrusion protruding inwardly referring to the orientation as depicted in the figure. As will discussed further, the semi-circular protrusions 1534, 1536 increase the means of contacting of the pad 1519 with a wheel during operation to effect cleaning. The protrusions 1534, 1536 are sized and shaped to contact smaller and/or narrower wheels relative to the spacing of the rectangular portions of the arms 1530, 1532. The protrusions 1534, 1536 may be formed by folding the terminal ends 1535 of the pad 1519 and glued, sewn, or otherwise fastened to form the protrusions.

The base plate 1504, as seen in FIG. 18-21, includes a configuration that allows for a secure connection and simple disconnection from shuttle 1526. The back side, i.e., the side opposite the receiver 1520 with the mounting plate attachment 1506, includes a button or post 1538. The post 1538 may be cylindrical or another suitable shape. The button 1538 is sized, shaped, and positioned to be inserted into a corresponding hole 1540 (FIGS. 20 and 21) of the shuttle 1526. In one embodiment, the button 1538 is spring biased into an outward position relative to the base plate 1504, and in another embodiment the post is fixed onto or a unitary part of the mounting plate attachment 1506 portion of the base plate.

To connect the base plate 1504 to the shuttle 1526, the mounting plate attachment 1506 is positioned generally parallel to and above the shuttle 1526 and moved downwardly until the button 1538 contacts the shuttle. Depressing the button 1538 either by causing the button to become depressed into the mounting plate attachment 1506 or by causing the material of the base plate 1504 to flex, permits the button to become aligned with and then engaged with the hole 1540 of the shuttle. The cartridge removal tab 1508 is brought into abutting contact with the top of the shuttle 1526 and stops the base plate 1504 from moving farther downwardly. The button 1538 and tab 1508 together secure the base plate 1504 and thus the cartridge 1518 to the shuttle 1526. To secure the base plate 1504 further, the top of the shuttle 1526 may have a cutout 1542 that receives the tab 1508 which can locate the base plate onto the shuttle for proper positioning of the cartridge. Releasing the cartridge 1528 from the shuttle 1526 involves depressing the button 1538 and thus disengaging the button from hole 1540 and lifting the cartridge by the tab 1508.

FIG. 22 illustrates another embodiment of a wheel cleaner system 1100 including an elongate body 1102, which is similar to those presented above, the cartridge 1518 of FIG. 16a, and the shuttle 1526 of FIGS. 20 and 21. The shuttle 1526 includes a pivot joint 1542 that, instead of being attached to a sled as in above embodiments, extends through slot 1550 to connect to a pin 1544. Rollers 1546 are disposed on the pin so as to enable the shuttle to move in the slot 1550. Bumpers or stops 1548 are disposed in or near left and right guide slots 1552, 1554 so as to cushion the return motion of the shuttle 1526 when the shuttle is returned to an initial entry position of the body 1102.

FIG. 23 illustrates a cleaning system with two wheel cleaners 1100, which can be used in tandem to simultaneously treat both front wheels of a conveyance. The two wheel cleaners 1100 can be considered a left wheel cleaner 1100a and a right wheel cleaner 1100b, which are positioned on and attachable to a mat 1302 in a spaced apart configuration that receives wheels of a cart (not shown) in tandem.

FIG. 24 illustrates use of a wheel cleaner 1100b disposed on a mat 1302 wherein a wheel 1556 of a cart or other conveyance is at an initial condition of contacting the cleaning pad portion 1519 of a cleaning cartridge 1518. It can be seen in FIGS. 24 and 25 that the configuration of the pad 1519 avoids contact with or interference from the yoke or bracket portion 1558 of the wheel 1556 and the protrusions 1534, 1536 are able to contact the wheel portion of the wheel to perform cleaning operations. In particular, the relationship between the wheel 1556 and pad 1519 is shown in FIG. 25 with the wheel in an intermediate position within the wheel cleaner 1100.

FIGS. 26-28 illustrate the position of the cartridge 1518 and shuttle 1526 in the wheel cleaner body 1102 of cleaning system 1100. In this view, the cleaning system 1100 includes a cartridge 1518 assembled to shuttle 1526, and the shuttle is assembled to body 1102. The assembled cartridge and shuttle 1518, 1526 are disposed at the entry end 1110 of the body 1102 whereas the arms 1532, 1534 of the hinged base plate 1504 are permitted to open (FIG. 26). In an intermediate condition (FIG. 27) the arms 1532, 1534 of the hinged base plate 1504 are urged closed as the cartridge moves toward exit 1114 so the cartridge assumes a configuration where the arms come into contact with a wheel of a conveyance (not shown). As the shuttle and cartridge 1526, 1518 are moved into the exit 1114 the cartridge is rotated and positioned into a receiving tray 1306 formed as a horizontal depression at the exit end of the body 1102 by way of the same mechanism of interaction of the shuttle 1526 and body 1102 as described above. The final resting position, before the shuttle 1526 is returned to an initial starting position at the entry end 1110 is shown in FIG. 29 with the shuttle positioned in the receiving tray 1306 to enable easy egress of the wheel of a conveyance passing through the cleaning system.

FIGS. 30 and 31 shows a side, cutaway view of the arrangement shown in FIG. 27. The wheel 1556, held by wheel bracket 1558, is located between the entry end 1110 and the exit end 1114 of body 1102 (FIG. 30). The shuttle 1526 is engaged with left side wall 1106 via left groove 1552 and holds cartridge 1518 against wheel 1556. While not shown, it will be understood that the shuttle 1526 is also engaged with the right-side wall (not shown) in like fashion. The wheel 1556 and shuttle/cartridge 1526, 1518 are supported by base plate 1104 and guided by the interaction of the rollers 1546 connected by pin 1544 with the shuttle pivot joint 1542 in slot 1550 of base plate 1104. The base plate 1104 may be formed with a corrugated or textured surface of some type to increase the friction of the wheel 1556 moving over the base 1104 and ensure that the wheel rotates as it travels from the entry to the exit of the cleaning device.

Generally, as in above embodiments, wheel 1556 pushes against pad of cartridge/shuttle 1518, 1526 at the entry end 1110 of body 1102 of wheel cleaner. The movement of wheel 1556 moves the shuttle 1526 toward the exit end 1114 and as the wheel rotates the pad portion of the cartridge 1518 cleans the surface of the wheel. The engagement of the shuttle 1526 in groove 1552, slot 1550, and the groove counterpart on the not-shown right wall of the body 1102 guides the shuttle down the center of the body toward the exit end 1114. When the shuttle 1526 reaches the parts of the groove 1552, the shuttle is urged to rotate and is positioned in the receiving tray 1306 at the exit end 1114 where the shuttle is positioned so as to not prohibit the wheel from exiting the body 1102.

Turning to FIGS. 32-35a, 35b the cleaning system body 1102 may include an optional damper 1570 that reduces the impact of a shuttle 1526 that is being returned to an initial position at the entry end 1110 by a return mechanism configured as in above embodiments. The damper 1570 may be disposed in either of the left wall 1106 or the right wall plate 1108 adjacent the entry end 1110 as shown in FIG. 32.

The damper 1570 as shown in FIGS. 33 and 34 may include a pair of housing parts 1572, 1574 that when assembled can be attached to the body 1102 by a pair of tabs 1576 formed on one or both of the housing parts. The tabs 1576 may be configured to attach to the body 1102 by any suitable fastener, such as screws, for example. The damper 1570 includes a damper arm 1578 that is sized and shaped to interact with a respective one of the shuttle guide arms 1408 to control the motion of the shuttle. The damper arm 1587 is mounted to one or both of the housing parts 1572, 1574 by way of a frictional mount 1580 so as to provide damping to the motion of the damper arm. The return of the shuttle 1526 to the entry end 1110 may be effected by a spring actuated cable rotary retraction device 1582 included in the damper 1570.

FIGS. 35*a-b* illustrate the interaction of the shuttle 1526 and damper 1570 as the shuttle is returned by the retraction device 1582 to the entry end 1110 of body 1102. The arm 1408 extends into the guide slot 1154 of the wall plate 1108. In FIG. 35*a* the damper arm 1587 is positioned to receive the arm 1408 of the shuttle 1526. In FIG. 35*b* the interaction of the arm 1408 with the damper arm 1587 as the shuttle 1526 and cartridge 1518 returns to an initial position adjacent the entry end 1110 causes the damper arm 1587 to rock or rotate from the position shown in FIG. 35*a* to the position shown in FIG. 35*b*. The rotation of the damper arm 1587 is resisted by frictional damping generated by the damper 1570, which slows the return movement of the shuttle 1526. In the position of the shuttle 1526 and cartridge 1518 shown in FIG. 35*b*, the cartridge is readied to receive a wheel for a cleaning operation.

Turning to FIGS. 36-38 it will be understood that the cleaning cartridges described and illustrated herein are similar in many aspects to the cleaning cartridges described in connection with FIGS. 1-35*a*, 35*b*, and therefore only the differences will be discussed in detail hereinbelow.

FIGS. 36-38 illustrate an embodiment of a cartridge 1518 and alternative attachments of a pad 1519 to a cartridge base plate 1504. Referring to FIG. 36, the base plate 1504 includes a cleaning pad receiver 1520 portion including a downward-opening hook or clip 1582 (relative to the figure as depicted). Downward-opening, in this context, means that the hook or clip 1582 is configured to receive a cooperating attachment device, such as a loop 1580 formed on the back side of the pad 1519, from below and connected with an upward motion of the element being attached to the hook or clip. Alternatively, the hook or clip may be upward-opening. The loop 1580 may be formed by attaching a strip of material to the back side of the pad by thermal bonding, sewing, an adhesive, or any suitable attachment method. The loop 1580 may be a textile, a plastic or elastomeric loop or any suitable feature configured to receive the clip 1582 therethrough.

FIG. 37 is an alternative construction for attaching a pad 1519 to a base plate 1504. The pad 1519 is provided with pockets 1584, one pocket respectively formed on an outside surface of each arm 1530, 1532. Each pocket 1584 is shaped and sized to receive a respective one of the hinged flaps (1512 shown) of the base plate 1504. The hinged flaps may be bonded thermally in place during or after assembly or fixed in position with an adhesive, for example, or any suitable attachment method. Turning to FIG. 38, the pad 1519 may be flame bonded, i.e., one method of thermal bonding, to the base plate 1504 to form an assembled cartridge 1518 in a simple and efficient manner without the need for additional assembly materials or features.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for cleaning a wheel, comprising:
providing an elongated body having a central channel, the central channel extending along an entire length of the body in a longitudinal direction, wherein the elongated body includes a base plate, a left wall plate, and a right wall plate, the left and right wall plates connected to the base plate and extending in spaced relation parallel to one another to define the central channel therebetween, and wherein the central channel includes an entry end and an exit end on opposite ends of the elongated body along the longitudinal direction;
providing a shuttle slidably disposed within the central channel, the shuttle having a mounting plate slidably engaged with the elongated body and disposed in a slot;
engaging a wheel entering the central channel through the entry end with the shuttle;

pushing the shuttle along the central channel with the wheel, the wheel having a rolling engagement with the shuttle and rolling along the base plate of the elongated body along the central channel; and disengaging the shuttle from the wheel adjacent the exit end;

wherein the rolling engagement between the shuttle and the wheel cleans the wheel.

2. The method of claim 1, further comprising providing the slot disposed between the left wall plate and the right wall plate in the base plate, and providing a sled slidably disposed and engaged in the slot, the sled being pivotally connected to a mounting plate of the shuttle such that a portion of the shuttle can rotate relative to the elongated body close to the exit end to permit the wheel to exit the central channel after the wheel disengages the shuttle.

3. The method of claim 1, further comprising retracting the shuttle using a retraction mechanism, the retraction mechanism is connected between the elongated body and the shuttle, the shuttle retraction mechanism operating to retract the shuttle from the exit end towards the entry end of the elongated body.

4. The method of claim 1, wherein the shuttle further includes a cleaning pad, the cleaning pad connected to the mounting plate and in direct contact with the wheel, and wherein the cleaning pad includes a cleaning solution.

5. The method of claim 2, further comprising providing a carriage included in the shuttle, the carriage having a mounting plate with arms extending therefrom, the arms slidably engaging guide slots formed in the left and right wall plates to guide the shuttle along the central channel.

6. The method of claim 4, wherein the shuttle includes a middle portion and two flaps extending on either side of the middle portion, each of the two flaps being pivotally connected to the middle portion such that the flaps converge to contact side surfaces of the wheel as the middle portion is pushed by a tread portion of the wheel as the shuttle moves along the elongated body during a cleaning operation.

7. The method of claim 5, wherein the guide slots includes a straight portion along a majority of the central channel and a downwardly curved end portion adjacent the exit end, and wherein the curved end portion is adapted to cause the shuttle to rotate away from the wheel as the wheel approaches the exit end.

8. The method of claim 6, wherein the cleaning pad is releasably attached to the mounting plate for replacement.

9. The method of claim 7, wherein the base plate further includes a depression adjacent the exit end, the depression configured to receive the shuttle when the shuttle is pushed towards the exit end.

* * * * *